United States Patent
Nakanishi

(10) Patent No.: US 12,306,608 B2
(45) Date of Patent: May 20, 2025

(54) INDUSTRIAL MACHINE MANAGEMENT SYSTEM, METHOD FOR MANAGING INDUSTRIAL MACHINE, AND NON-TRANSITORY COMPUTER-READABLE STORAGE MEDIUM

(71) Applicant: Kabushiki Kaisha Yaskawa Denki, Kitakyushu (JP)

(72) Inventor: Mitsuaki Nakanishi, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 318 days.

(21) Appl. No.: 16/773,039

(22) Filed: Jan. 27, 2020

(65) Prior Publication Data
US 2020/0241502 A1    Jul. 30, 2020

(30) Foreign Application Priority Data
Jan. 28, 2019    (JP) ................. 2019-012165

(51) Int. Cl.
*G05B 19/408* (2006.01)
*B25J 9/16* (2006.01)

(52) U.S. Cl.
CPC ........ *G05B 19/4083* (2013.01); *B25J 9/1674* (2013.01); *G05B 2219/31333* (2013.01); *G05B 2219/32398* (2013.01)

(58) Field of Classification Search
CPC ...... G05B 19/4083; G05B 2219/31333; G05B 2219/32398; G05B 19/41865;
(Continued)

(56) References Cited

U.S. PATENT DOCUMENTS 6,167,328 A     12/2000  Takaoka et al.
2014/0337277 A1*  11/2014  Asenjo ............ G06F 16/283
                                                      707/603
(Continued)

FOREIGN PATENT DOCUMENTS

CN    103085072 A  *  5/2013
CN    103176901 A     6/2013
(Continued)

OTHER PUBLICATIONS

Japanese Office Action issued Jan. 5, 2021 in Japanese Patent Application No. 2019-012165 (with partial English translation), 5 pages.
(Continued)

*Primary Examiner* — Catherine T. Rastovski
*Assistant Examiner* — Yossef Korang-Beheshti
(74) *Attorney, Agent, or Firm* — Oblon, McClelland, Maier & Neustadt, L.L.P.

(57) ABSTRACT

An industrial machine management system includes circuitry that collects changeable setting data of an industrial machine, determines, based on the setting data at each time point of multiple time points, whether a change has been made to the setting data, obtains pre-change information when the change is determined as having been made to the setting data, the pre-change information regarding a pre-change state of the industrial machine as of a first time prior to the change having been made to the setting data, obtains post-change information when the change is determined as having been made to the setting data, the post-change information regarding a post-change state of the industrial machine as of a second time after the change has been made to the setting data, and based on the pre-change information and the post-change information, outputs influence information regarding an influence of the change.

19 Claims, 18 Drawing Sheets

(58) Field of Classification Search
CPC .......... G05B 2219/32252; B24J 9/1674; Y02P 90/30; G06Q 10/06; G06Q 50/04
See application file for complete search history.

(56) References Cited

U.S. PATENT DOCUMENTS

| | | | |
|---|---|---|---|
| 2014/0358279 A1 | 12/2014 | Kimoto | |
| 2015/0121556 A1 | 4/2015 | Hashimoto et al. | |
| 2017/0031338 A1* | 2/2017 | Nakamura | G05B 19/4063 |
| 2017/0132292 A1 | 5/2017 | Liu et al. | |
| 2017/0153608 A1* | 6/2017 | Ueda | G05B 19/409 |
| 2018/0095640 A1 | 4/2018 | Albright et al. | |
| 2018/0364678 A1* | 12/2018 | Ikai | G05B 19/4083 |
| 2019/0143524 A1 | 5/2019 | Takahashi et al. | |
| 2019/0273816 A1* | 9/2019 | Choi | H04M 1/72403 |
| 2019/0366546 A1* | 12/2019 | Nakamura | G05B 23/02 |

FOREIGN PATENT DOCUMENTS

| | | | |
|---|---|---|---|
| CN | 106330049 A | * | 1/2017 |
| CN | 109782173 A | * | 5/2019 |
| CN | 109975134 A | * | 7/2019 |
| EP | 0 852 346 A1 | | 7/1998 |
| JP | H081557 A | * | 1/1996 |
| JP | 2004-5400 A | | 1/2004 |
| JP | 2004280286 A | * | 10/2004 |
| JP | 6-238548 A | | 11/2007 |
| JP | 2014-233763 A | | 12/2014 |
| JP | 2015-087879 A | | 5/2015 |
| JP | 2016-206824 A | | 12/2016 |
| JP | 2017-91114 A | | 5/2017 |
| JP | 2017119320 A | * | 7/2017 |
| JP | 2017-194921 A | | 10/2017 |
| JP | 2018-58117 A | | 4/2018 |

OTHER PUBLICATIONS

Japanese Office Action issued Jan. 5, 2021 in Japanese Patent Application No. 2019-012164 (with partial English translation), 5 pages.
Office Action mailed Aug. 25, 2021 in co-pending U.S. Appl. No. 16/752,858 Examiner: Yossef Korang-Beheshti, 20 pages.
Extended European Search Report issued Mar. 19, 2020 in European Patent Application No. 20153870.9, 9 pages.
Extended European Search Report issued Mar. 19, 2020 in European Patent Application No. 20153869.1, 8 pages.
Japanese Office Action issued Aug. 25, 2020 in Japanese Patent Application No. 2019-012184 (with partial English translation), 6 pages.
Japanese Office Action issued Aug. 25, 2020 in Japanese Patent Application No. 2019-012165 (with partial English translation), 7 pages.
European Office Action issued Dec. 13, 2021 in European Patent Application No. 20 153 869.1, 8 pages.
European Office Action issued Dec. 16, 2021 in European Patent Application No. 20 153 870.9, 4 pages.
Final Office Action mailed Apr. 20, 2022 in co-pending U.S. Appl. No. 16/752,858. First Named Inventor: Mitsuaki Nakanishi (19 pages).
Office Action dated Jan. 11, 2022 issued in related U.S. Appl. No. 16/752,858.
First Office Action issued Oct. 28, 2022, in Chinese Patent Application No. 201911111700.7 (with computer generated English translation), 25 pages.

* cited by examiner

FIG. 3

Change-lists screen — G2

Controller X

2019/01/15
    | - Program A
    | - Program B    } N20
    | - Parameter C
2019/01/11
2019/01/10
2019/01/09
2019/01/08
  .

-Date with program and/or parameter indicates that setting change has been made.
-To display change information, select program or parameter.
-Date without program and/or parameter indicates that no setting change has been made.

FIG. 4

Change information screen
Controller X   Program A

```
/JOB
//NAME ZMOVE_3-8
.
.
///PULSE
C00000=123456,1842,-9241····
C00001=51901,-4039,82710····
C00002=-62018,412901,-1895····
.
.
//GROUP1 RB1
NOP
MOVJ C00000 VJ=100.00
MOVJ C00001 VJ=100.00
MOVJ C00002 VJ=100.00
MOVJ C00003 VJ=100.00
.
.
.
END
```
2019/01/11

```
/JOB
//NAME ZMOVE_3-8
.
.
///PULSE
C00000=123456,1842,-9241····
C00001=51901,-4039,82710····
C00002=-62018,412901,-1895····
.
.
//GROUP1 RB1
NOP
MOVJ C00000 VJ=100.00
MOVJ C00001 VJ=80.00
MOVJ C00002 VJ=80.00
MOVJ C00003 VJ=100.00
.
.
.
END
```
2019/01/15

Mail setting screen

| Production line | Controller |
|---|---|
| Production line 1 | Controller X |

Select user to be notified.

| User | Notification |
|---|---|
| admin | ☐ |
| user1 | ☐ |
| user2 | ☐ |
| user3 | ☐ |

B40 (bracketing Notification column)

| Controller | Production line | Backup information | | | Mail setting information |
| --- | --- | --- | --- | --- | --- |
| | | Backup date | Setting data | Changed-unchanged information | |
| Controller X | Production line 1 | 2019/1/15 | Program A, Program B, Parameter C · · · | Changed: Program A, Program B, Parameter C | admin.user1 |
| | | 2019/1/11 | Program A, Program B, Parameter C · · · | Not changed | |
| | | 2019/1/10 | Program A, Program B, Parameter C · · · | Not changed | |
| | | · · · | · · · | | |
| Controller Y | Production line 1 | 2019/1/15 | Program D, Parameter E, Program F · · · | Changed: Program F | admin.user2.user3 |
| | | 2019/1/11 | Program D, Parameter E, Program F · · · | Not changed | |
| | | 2019/1/10 | Program D, Parameter E, Program F · · · | Not changed | |
| | | · · · | · · · | | |

FIG. 11

Change information screen
Controller X   Program A

```
//GROUP1 RB1
NOP
MOVJ C00000 VJ=100.00
MOVJ C00001 VJ=100.00
MOVJ C00002 VJ=100.00
MOVJ C00003 VJ=100.00
```

2019/01/11

| | S | L | U | R | B | T |
|---|---|---|---|---|---|---|
| Reducer lifetime | 2000 | 1000 | 1500 | 2000 | 3000 | 4000 |
| Load factor | 60 | 80 | 70 | 55 | 40 | 20 |

```
//GROUP1 RB1
NOP
MOVJ C00000 VJ=100.00
MOVJ C00001 VJ=80.00
MOVJ C00002 VJ=80.00
MOVJ C00003 VJ=100.00
```

2019/01/15

| | S | L | U | R | B | T |
|---|---|---|---|---|---|---|
| Reducer lifetime | 1000 | 1000 | 1500 | 2000 | 3000 | 4000 |
| Load factor | 80 | 80 | 70 | 55 | 40 | 20 |

| Controller | Production line | Backup information | | | | Mail setting information |
|---|---|---|---|---|---|---|
| | | Backup date | Setting data | Changed-unchanged information | State information | |
| Controller X | Production line 1 | 2019/1/15 | Program A, Program B, Parameter C | Changed: Program A, Program B, Parameter C | Lifetime info, Load factor info etc. | admin.user1 |
| | | 2019/1/11 | Program A, Program B, Parameter C | Not changed | Lifetime info, Load factor info etc. | |
| | | 2019/1/10 | Program A, Program B, Parameter C | Not changed | Lifetime info, Load factor info etc. | |
| | | ... | ... | ... | ... | |
| Controller Y | Production line 1 | 2019/1/15 | Program D, Parameter E, Program F | Changed: Program F | Lifetime info, Load factor info etc. | admin.user2.user3 |
| | | 2019/1/11 | Program D, Parameter E, Program F | Not changed | Lifetime info, Load factor info etc. | |
| | | 2019/1/10 | Program D, Parameter E, Program F | Not changed | Lifetime info, Load factor info etc. | |
| | | ... | ... | ... | ... | |

FIG. 18

Change information screen

Controller X   Program A

```
.
.
.
//GROUP1 RB1
NOP
MOVJ C00000 VJ=100.00
MOVJ C00001 VJ=100.00
MOVJ C00002 VJ=100.00
MOVJ C00003 VJ=100.00
.
.
.
```
2019/01/11

```
.
.
.
//GROUP1 RB1
NOP
MOVJ C00000 VJ=100.00
MOVJ C00001 VJ=80.00
MOVJ C00002 VJ=80.00
MOVJ C00003 VJ=100.00
.
.
.
```
2019/01/15

| | S | L | U | R | B | T |
|---|---|---|---|---|---|---|
| Reducer lifetime change | -1000 | ±0 | ±0 | ±0 | ±0 | ±0 |
| Load factor change | +20 | ±0 | ±0 | ±0 | ±0 | ±0 |

G3

INDUSTRIAL MACHINE MANAGEMENT SYSTEM, METHOD FOR MANAGING INDUSTRIAL MACHINE, AND NON-TRANSITORY COMPUTER-READABLE STORAGE MEDIUM

CROSS-REFERENCE TO RELATED APPLICATIONS

The present application claims priority under 35 U.S.C. § 119 to Japanese Patent Application No. 2019-012165, filed Jan. 28, 2019. The contents of this application are incorporated herein by reference in their entirety.

BACKGROUND

Field of the Invention

The embodiments disclosed herein relate to an industrial machine management system, a method for managing an industrial machine, and a non-transitory computer-readable storage medium.

Discussion of the Background

JP 2015-087879A discloses a system that makes parameters of an industrial machine adjustable by connecting an engineering tool to the industrial machine, and that makes the industrial machine upload the resulting parameters to a cloud server for backup and other purposes.

SUMMARY

According to one aspect of the present invention, an industrial machine management system includes circuitry that collects changeable setting data of an industrial machine, determines, based on the setting data at each time point of multiple time points, whether a change has been made to the setting data, obtains pre-change information when the change is determined as having been made to the setting data, the pre-change information regarding a pre-change state of the industrial machine as of a first time prior to the change having been made to the setting data, obtains post-change information when the change is determined as having been made to the setting data, the post-change information regarding a post-change state of the industrial machine as of a second time after the change has been made to the setting data, and based on the pre-change information and the post-change information, outputs influence information regarding an influence of the change.

According to another aspect of the present invention, a method for managing an industrial machine includes collecting changeable setting data of the industrial machine, determining, based on the setting data at each time point of multiple time points, whether a change has been made to the setting data, obtaining pre-change information when the change is determined as having been made to the setting data, the pre-change information regarding a pre-change state of the industrial machine as of a first time prior to the change having been made to the setting data, obtaining post-change information when the change is determined as having been made to the setting data, the post-change information regarding a post-change state of the industrial machine as of a second time after the change has been made to the setting data, and based on the pre-change information and the post-change information, outputting influence information regarding an influence of the change.

According to yet another aspect of the present invention, a non-transitory computer-readable storage medium is storing a program for causing a computer to execute a method for managing an industrial machine. The method includes collecting changeable setting data of the industrial machine, determining, based on the setting data at each time point of multiple time points, whether a change has been made to the setting data, obtaining pre-change information when the change is determined as having been made to the setting data, the pre-change information regarding a pre-change state of the industrial machine as of a first time prior to the change having been made to the setting data, obtaining post-change information when the change is determined as being made to the setting data, the post-change information regarding a post-change state of the industrial machine as of a second time after the change having been made to the setting data, and based on the pre-change information and the post-change information, outputting influence information regarding an influence of the change.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 3 illustrates an example change-lists screen;

FIG. 4 illustrates an example change information screen;

FIG. 5 illustrates an example mail setting screen;

FIG. 7 illustrates an example of how data is stored in a controller database;

FIG. 11 illustrates an example change information screen according to a second embodiment;

FIG. 13 illustrates an example of how data is stored in a controller database according to the second embodiment;

FIG. 18 illustrates an example change information screen according to modification 2-1.

DESCRIPTION OF THE EMBODIMENTS

1. First Embodiment

According to the inventors' knowledge and experience, changes are frequently made to programs, parameters, and other setting data set for industrial machines. These changes are made by workers or other personnel in factories, plants, and other industrial facilities in which these industrial machines are used, and it is often the case that users in charge of management of the industrial machines are unaware of the changes. This makes it quite laborious for these users to manage changes made to setting data. In light of the considerations above, the inventors conducted extensive studies in an attempt to facilitate management of changes made to setting data, and as a result, have conceived of a novel and unique industrial machine management system and a related machine and a related method. An industrial machine management system and a related machine and a related method according to the first embodiment will be described in detail below.

1-1. General Arrangement of Industrial Machine Management System

Figure 1:
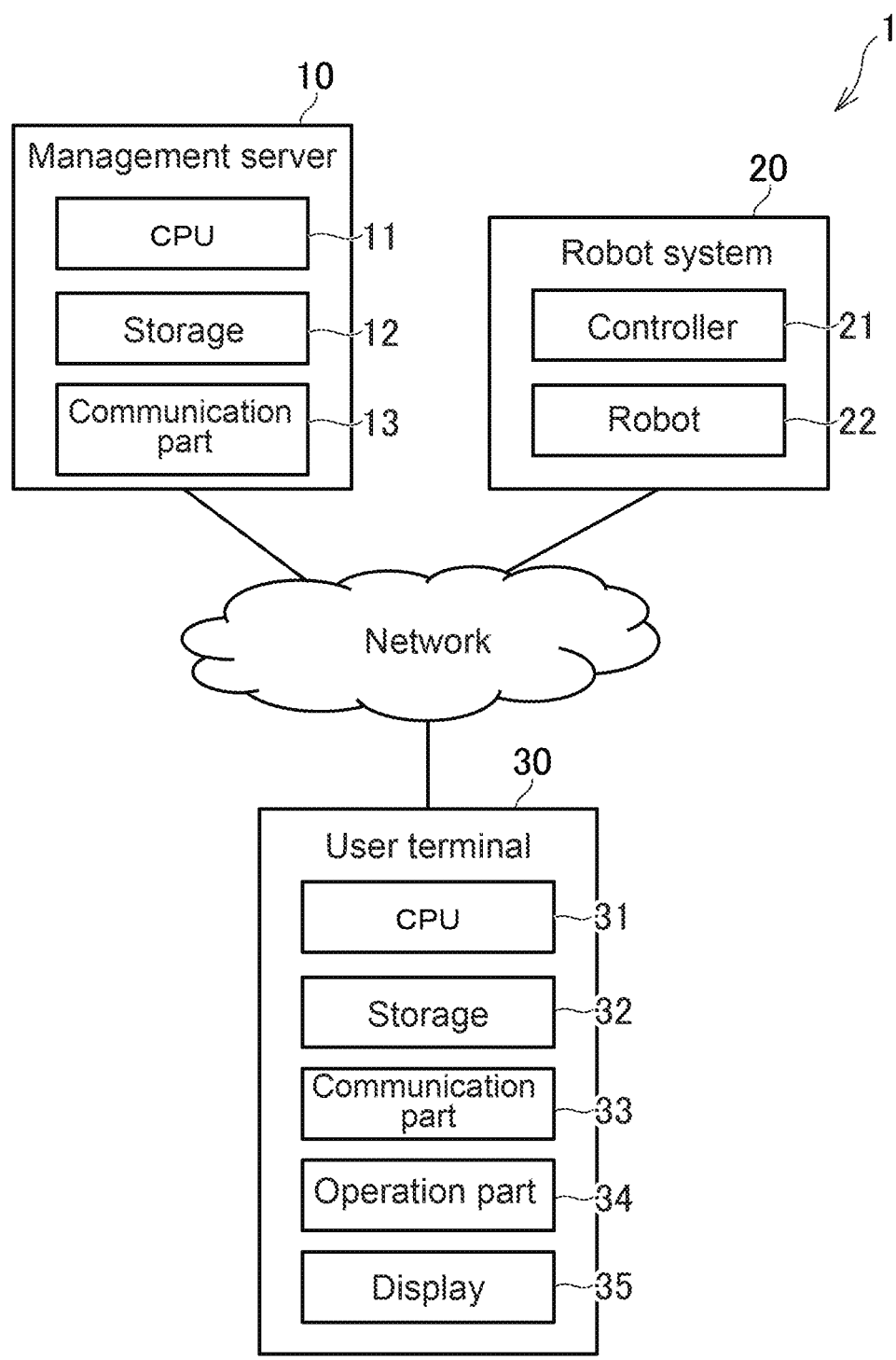
FIG. 1 illustrates a general arrangement of an industrial machine management system according to a first embodiment.

FIG. 1 illustrates a general arrangement of an industrial machine management system 1 according to the first embodiment. As illustrated in FIG. 1, the industrial machine management system 1 includes a management server 10, a robot system 20, and a user terminal 30. The management server 10, the robot system 20, and the user terminal 30 are connected to a network such as a local area network (LAN) or the Internet or another network. While FIG. 1 illustrates a single management server 10, a single robot system 20, and a single user terminal 30, these elements may be provided in plural.

The management server 10 is a server computer. It is to be noted that the management server 10 may be implemented by a computer such as a personal computer, a mobile phone (including a smartphone), and a portable terminal (including a tablet terminal), if the computer has functions of a server. The management server 10 includes a CPU 11, a storage 12, and a communication part 13.

The CPU 11 includes at least one processor. The storage 12 includes: a volatile memory such as RAM; and a non-volatile memory such as a hard disc. With this configuration, the storage 12 stores various programs and data. The CPU 11 performs various kinds of processing based on these programs and data. The CPU 11 includes a circuit or a plurality of circuits (circuitry) to perform various kinds of processing based on these programs and data. The communication part 13 includes a communication interface such as a network card and various communication connectors. With this configuration, the communication part 13 communicates with other apparatuses and/or devices.

The robot system 20 includes a controller 21 and a robot 22. While FIG. 1 illustrates a single controller 21 and a single robot 22, these elements may be provided in plural. For example, the robot system 20 may include a plurality of controllers 21, or a single controller 21 may control a plurality of robots 22.

The controller 21 is a computer that controls the robot 22. While the controller 21 may be a specialized controller dedicated to the robot 22, the controller 21 according to this embodiment is a general-purpose computer. The controller 21 includes hardware such as a CPU, a RAM, a hard disc, and a communication interface. With this configuration, the controller 21 transmits a motion instruction to the robot 22.

The robot 22 is an industrial robot. The robot 22 may be a general-purpose multi-articular robot, examples including, but not limited to, a vertical multi-articular robot, a horizontal multi-articular robot, and a gantry robot. The robot 22 may have any number of arms; for example, the robot 22 may have a single arm or a plurality of arms. The robot 22 may be used in any applications, examples including, but not limited to, welding such as gas welding or arc welding, assembly of parts, and processing of food and/or food products.

The controller 21 and the robot 22 are non-limiting examples of the industrial machine recited in the appended claims. Thus, the controller 21 and the robot 22 recited in this embodiment can be replaced with the industrial machine. Any type of industrial machines are applicable to the industrial machine management system 1, examples of the industrial machine including, but not limited to, a motor controller, a servo motor, an inverter, a machine tool, and a Programmable Logic Controller (PLC). Any of these industrial machines may operate in the industrial machine management system 1.

The robot system 20 may also include an apparatus or a device other than the controller 21 and the robot 22. A non-limiting example is a sensor that detects a motion status in which the robot 22 is making a motion. The sensor may be any sensor such as a torque sensor, a motor encoder, a proximity sensor, a holding sensor, a pressure sensitive sensor, a motion sensor, a sputtering sensor, and a temperature sensor. The robot system 20 may also include: a camera that takes an image of a motion of the robot 22; and/or an input-output (I/O) device that receives and outputs data.

The user terminal 30 is a computer operated by a user. In this embodiment, the user is in charge of management of the robot system 20 as a whole, and is a person different from a worker who manages the controller 21 and a worker who manages the robot 22. Another possible example is that the workers correspond to the user. Examples of the user terminal 30 include, but are not limited to, a personal computer, a mobile phone (including a smartphone), and a portable terminal (including a tablet terminal).

The user terminal 30 includes a CPU 31, a storage 32, a communication part 33, an operation part 34, and a display part 35. The CPU 31, the storage 32, and the communication part 33 may be similar in hardware configuration respectively to the CPU 11, the storage 12, and the communication part 13. The operation part 34 is an input device made up of a mouse, a keyboard, and/or a related device. Examples of the display part 35 include, but are not limited to, a liquid crystal display and an organic electroluminescent (EL) display. In response to an instruction from the CPU 31, the display part 35 displays various screens.

It is to be noted that the programs and data described as being stored in the management server 10, the controller 21, and the user terminal 30 may be supplied to these elements through the network. It is also to be noted that each of the management server 10, the controller 21, and the user terminal 30 will not be limited to the above-described hardware configuration but may have any other hardware configuration. For example, any of the management server 10, the controller 21, and the user terminal 30 may include: a reader that reads a computer readable information storage medium (examples including an optical disc drive and a memory card slot); and/or an input/output device directly connectable to external devices (examples including a USB terminal). In this case, programs and/or data stored in an information storage medium may be supplied to the above elements through the reader and/or the input/output device.

1-2. Outline of Industrial Machine Management System

In the industrial machine management system 1, the controller 21 controls motions of the robot 22 based on setting data stored in the controller 21 itself. As used herein, the term "setting data" refers to data of settings associated with motions of the robot 22, examples including, but not limited to, programs and parameters. Thus, the programs and/or the parameters recited in this embodiment as being stored in the controller 21 may be replaced with the setting data.

A program may also be referred to as a job or a task, and encompasses a program code of a command (instruction) to the robot 22. In addition to a command to the robot 22, a program code may include: a variable(s) involved when the command is executed; and/or other information such as a comment, a header, and other additional notes related to the command. The programming language used in the program code may be any language known in the art, examples including, but not limited to, C language, C++, Java (®, registered trademark), and Python.

In one possible example, motions of the robot 22 are defined in a program code. For example, when the robot 22 makes motions periodically, motions of the robot 22 corresponding to the respective periods are described in the program code on a time-series basis. In another possible example, a track of the robot 22 is defined in a program code. The method of generating a track of the robot 22 may be any method known in the art, examples including, but not limited to, linear interpolation and link interpolation. In the program code, time-series positions of the robot 22 are defined. In another possible example, a wait command to the robot 22 is defined in a program code. The wait command shows the period of time for which the robot 22 waits, instead of making a movement. In another possible example, the timing and/or the strength at which the robot 22 opens and closes its hand is defined in a program code. In another possible example, the output of an electric gun mounted on the robot 22 is defined in a program code.

A parameter is a value output to the robot 22, examples including, but not limited to, the number of rotations of a motor(s) (speed), the rotational angle of the motor(s), torque value, current value, and the period of time for which current is on. A parameter may be referred to by a program or may be described in the program. A position of the robot 22 described in the program and waiting time described in the program may be regarded as kinds of parameter. For example, individual parameters may be regarded as setting data, or a parameter file in which a plurality of parameters are stored may be regarded as setting data. In the parameter file, the values of the parameter may be described on a time-series basis.

The robot system 20 is installed in a factory, a plant, or another industrial facility, and a change is made to the setting data by a worker who manages the controller 21 and the robot 22 (or a worker who manages the controller 21 and/or a worker who manages the robot 22). As used herein, the term "change" encompasses an update, an editing, and an adjustment. In one example, the worker checks a motion that the robot 22 is actually making and/or checks a state that an object (workpiece) worked on by the robot 22 is in. In this manner, the worker determines whether it is necessary to change the setting data. In another example, the worker checks whether an alarm has occurred in the controller 21, and/or checks a stop situation of the robot 22. In this manner, the worker determines whether it is necessary to change the setting data.

When the worker determines that it is necessary to change the setting data, the worker connects, for example, an engineering tool-equipped terminal to the controller 21, and changes the setting data. In one example, the worker changes a program by making an addition to, changing, or deleting a program code or by changing the value of a variable in the program. In another example, the worker prepares a new program and/or deletes an unnecessary program. In another example, the worker changes a program by changing the value of a parameter and/or deleting a parameter that is no longer necessary. In another example, the worker adds a new parameter or deletes an unnecessary parameter.

Although the user is in charge of management of the robot system 20 as a whole, it is often the case that the worker who manages the controller 21 and the robot 22 changes the setting data without the user's knowing. In light of this, in this embodiment, when the worker has made a change to the setting data, the user terminal 30 displays various information regarding the change made to the setting data. For example, when the user operates the user terminal 30 to access the management server 10, the display part 35 displays a main screen for the user to manage the robot system 20.

Figure 2:
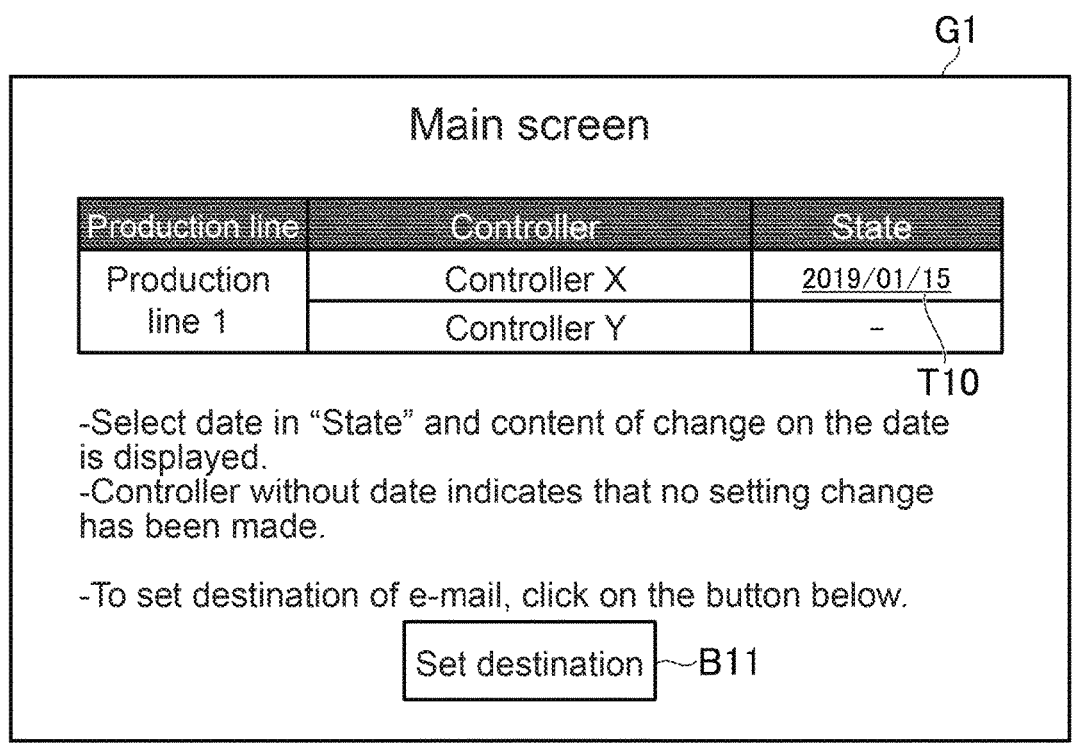
FIG. 2 illustrates an example main screen.

FIG. 2 illustrates an example main screen. As illustrated in FIG. 2, main screen G1 displays production line number and the name of the controller 21 to control the robot 22 that works on the production line numbered. In the example illustrated in FIG. 2, two controllers 21 named "Controller X" and "Controller Y" control the target robot 22 on "Production line 1". It is to be noted that there may be a plurality of production lines insofar as at least one controller 21 and at least one robot 22 belong to each production line.

In the first embodiment, the management server 10 periodically obtains a backup of the setting data from the controller 21. Every time the management server 10 obtains a backup, the management server 10 determines whether a change has been made to the setting data. When a change is made to the setting data of one controller 21, the main screen G1 displays an item related to this controller 21, namely, the date at which the change was made to the setting data (that is, the date at which the backup in which the change was detected was obtained).

In the example illustrated in FIG. 2, a change made to the setting data of the controller X is detected at the backup time dated "Jan. 15, 2019". In contrast, no date is shown in the section of the controller Y, indicating that no change is made to the setting data. When the user selects date T10, which corresponds to the controller X, the display part 35 displays a change-lists screen. The change-lists screen displays lists of changes made to the setting data.

FIG. 3 illustrates an example change-lists screen. As illustrated in FIG. 3, change-lists screen G2 displays dates on which backups of the setting data were obtained, with lists of changes made to the setting data on the dates. In the example illustrated in FIG. 3, the change-lists screen G2 displays that on Jan. 15, 2019, changes were made to the setting data of the controller X, namely, "program A", "program B", and "parameter C". These changes are named N20. Although backups were obtained on the other dates, no change was detected in the setting data and thus no names of the setting data are shown.

When the user selects the name N20 on the change-lists screen G2, the display part 35 displays a change information screen. The change information screen displays details of the changes made to the setting data. The following description is regarding a case where the program A on Jan. 15, 2019 is selected on the change-lists screen G2.

FIG. 4 illustrates an example change information screen. As illustrated in FIG. 4, change information screen G3 displays information regarding the change made to the program A on Jan. 15, 2019. Specifically, the program code of the pre-change program A and the program code of the post-change program A are arranged next to each other for comparison purposes.

In the example illustrated in FIG. 4, the pre-change program code is the program code of the program A whose backup was obtained most previously, namely, Jan. 11, 2019. It is also possible to show a program code backup obtained before Jan. 11, 2019. The post-change program code is the program code of the program A on the date selected by the user on the change-lists screen G2; specifically, the program code of the program A on Jan. 15, 2019.

In the first embodiment, the content of the change made to the setting data is emphasized on the change information screen G3. In the example illustrated in FIG. 4, the content of the change is emphasized using underlines, showing that the movement command "MOVJ C00001 VJ=80.00" to the robot 22 and the movement command "MOVJ C00002 VJ=80.00" to the robot 22 are changed.

It is to be noted that the method of emphasizing the content of the change will not be limited to the use of underlines, and any other method may be used. A possible example is to use a predetermined color, such as red and blue, to emphasize the content of the change made to the setting data. Another possible example is to make the content of the change larger in font size than the other elements of the setting data. Another possible example is to show the content of the change in Italic or bold. Another possible example is to show the content of the change using a particular font different from the other elements of the setting data.

While the above description is regarding a case where a program is selected on the change-lists screen G2, a parameter may be selected on the change-lists screen G2. In this case, the name of the parameter selected and the content of the change made to the parameter selected are shown on the change information screen G3. In one example, the content of the change to be shown may be the amount by which the parameter was changed. In another example, when a parameter selected includes values aligned on a time-series basis, the content of the change may be the time point at which the parameter was changed. In another example, when a parameter file selected stores a plurality of parameters, the content of the change may be a parameter, among the plurality of parameters, that was changed.

In this embodiment, when a change is made to the setting data, not only information regarding the change is shown on the change information screen G3, but also a predetermined notification is transmitted to the user. In this embodiment, such predetermined notification is sent by electronic mail. It is possible, however, to use any other means of notification, such as message application, short message service (SMS), social networking service (SNS), and push notification technology.

When there are a plurality of users to manage the robot system 20, it is possible to send an electronic mail to all the users. In this embodiment, however, an electronic mail destination can be set on a controller 21 basis. It is to be noted that an electronic mail destination may be set on a robot 22 basis or on a production line basis, instead of on a controller 21 basis. It is also to be noted that an electronic mail may be sent not only to the user but also to a worker(s) and/or other personnel. When the user has specified a controller 21 to set a destination(s) on the main screen G1 and selected button B11 on the main screen G1, the display part 35 displays mail setting screen G4. The mail setting screen G4 is a screen for setting a destination(s).

FIG. 5 illustrates an example mail setting screen. As illustrated in FIG. 5, the mail setting screen G4 is a screen for specifying, among a plurality of predetermined destinations, a destination to which an electronic mail is to be sent.

The example illustrated in FIG. 5 is that when a change is made to the setting data of the controller X, there are four candidates to send an electronic mail, namely, "admin", "user 1" "user 2", and "user 3". The user selects at least one candidate among the four candidates. For example, the user clicks on check box B40 to specify a candidate(s).

Thus, the industrial machine management system 1 according to the first embodiment ensures that when a change is made to the setting data of the controller 21, details of the change are shown on screens including the change information screen G3, and an electronic mail is sent to a destination(s) specified by the user. This, in turn, ensures that if a worker has made a change to the setting data without the user's knowing, the user becomes aware or notified of the change, enabling the user to more readily manage the change. The industrial machine management system 1 according to the first embodiment will be described in more detail below.

1-3. Functions of Industrial Machine Management System

Figure 6:
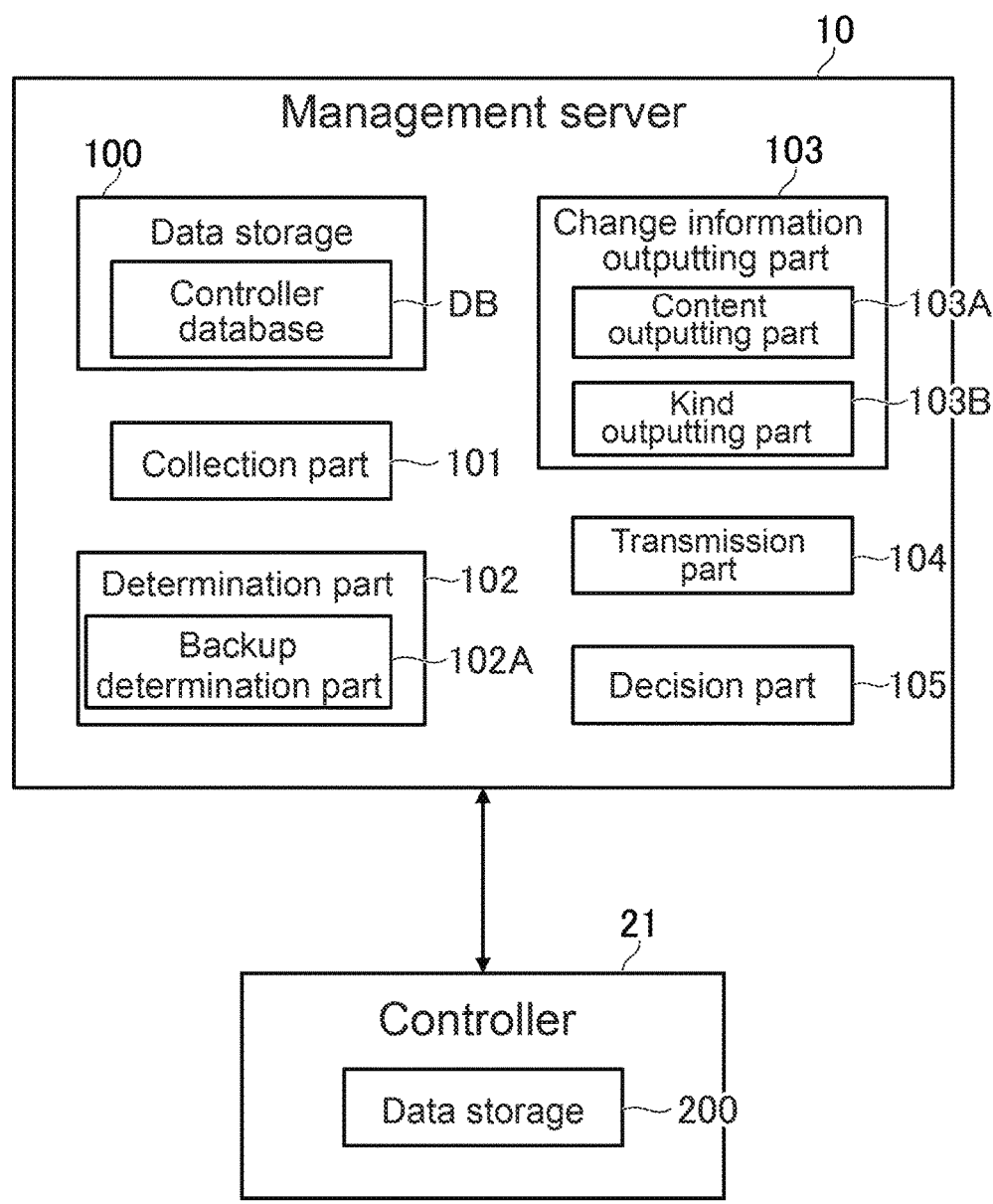
FIG. 6 is a functional block diagram of functions of the industrial machine management system.

FIG. 6 is a functional block diagram of functions of the industrial machine management system 1. The following description is regarding functions of the controller 21 and functions of the management server 10.

Functions of Controller

As illustrated in FIG. 6, the controller 21 includes a data storage 200. The data storage 200 is mainly implemented by the storage of the controller 21, and stores at least one setting data. It is to be noted that the number of setting data stored in the data storage 200 may be any number that is determined based on the purpose and application of the controller 21 and the robot 22. For example, when the controller 21 controls a plurality of robots 22, the data storage 200 stores setting data on a robot 22 basis.

The setting data stored in the data storage 200 may be changed by the worker operating the worker's terminal or by the user operating the user terminal 30. In this embodiment, a backup of the setting data is obtained periodically. Specifically, the management server 10 transmits a transmission command for the setting data to the controller 21, and in response, the controller 21 transmits the setting data stored in the data storage 200 to the management server 10. It is to be noted that the controller 21 may voluntarily transmit the setting data to the management server 10.

Functions of Management Server

As illustrated in FIG. 6, the management server 10 includes a data storage 100, a collection part 101, a determination part 102, a change information outputting part 103, a transmission part 104, and a decision part 105. The data storage 100 is mainly implemented by the storage 12, and the other functions are mainly implemented by the CPU 11.

Data Storage

The data storage 100 stores data for managing the robot system 20. The data storage 100 stores a controller database DB. The controller database DB stores data about the controller 21.

FIG. 7 illustrates an example of how data is stored in the controller database DB. As illustrated in FIG. 7, the controller database DB stores the name of the controller 21, the production line to which the controller 21 belongs, backup information, and mail setting information. It is to be noted that the information stored in the controller database DB will not be limited to the above-described information. For example, the controller database DB may store information regarding an alarm that occurs in the controller 21 and/or trace data showing motion statuses of the robot 22 on a time-series basis.

The backup information is information regarding backup of the setting data. Examples of the backup information include, but are not limited to, backup time of the setting data, real data of the setting data from which a backup was obtained, and changed-unchanged information regarding whether a change has been made to the setting data. It is to be noted that the backup time of the setting data may be not only date but also time.

In this embodiment, the setting data stored in the controller database DB is setting data that is collected by the collection part 101, described later. In light of this, the data storage 100 stores, as a backup, the setting data collected by the collection part 101. Since a backup of the setting data is obtained repeatedly, the controller database DB stores a backup history of the setting data obtained in the past.

It is to be noted that old setting data may be automatically deleted so that only setting data corresponding to a predetermined recent period of time is stored or setting data corresponding to an n-th backup (n is natural number) is stored. In this embodiment, the setting data of all the controllers 21 are subjected to backup. Another possible example is that the setting data of some of the controllers 21 is subjected to backup. In this case, the determination as to whether a change has been made may be performed with respect to only those setting data that are subjected to backup.

When a change is made to the setting data, the changed-unchanged information shows a first value (a value corresponding to "change made" in FIG. 7). When no change is made to the setting data, the changed-unchanged information shows a second value (a value corresponding to "no change" in FIG. 7). Thus, the first value of the changed-unchanged information indicates that a change in the setting data is detected at the corresponding backup time, while the second value of the changed-unchanged information indicates that no change in the setting data is detected at the corresponding backup time. In the changed-unchanged information with the first value, a name(s) of the setting data that is changed is stored.

The mail setting information is regarding a destination(s) to which an electronic mail is sent when a change is made to the setting data. While in the example illustrated in FIG. 7 the mail setting information shows a user's name, the mail setting information may show an electronic mail address. It is to be noted that when the mail setting information shows a user's name, the electronic mail address of the user is stored in a database different from the controller database DB. In this embodiment, a destination(s) of an electronic mail is set on the mail setting screen G4. Therefore, the name of the user checked on the check box B40 on the mail setting screen G4 is incorporated in the mail setting information.

It is to be noted that the data stored in the data storage 100 will not be limited to the above-described data. In one example, the data storage 100 may store a database in which basic information on the user and the worker is stored, or may store a format of an electronic mail that is sent when a change is made to the setting data. In another example, the data storage 100 may store data (for example, HTML data and/or image data) to be displayed on the main screen G1, the change-lists screen G2, the change information screen G3, and the mail setting screen G4.

Collection Part

The collection part 101 collects changeable setting data from the controller 21. As used herein, the term "to collect" refers to obtain or receive data from the controller 21. The collection part 101 collects the setting data at each time point of a plurality of time points. In other words, the collection part 101 repeatedly collects the setting data. The collection part 101 may collect the setting data periodically or non-periodically. A possible example of when the collection part 101 collects the setting data non-periodically is that when an alarm occurs. Another possible example is when the user instructs collection of the setting data.

The first embodiment is regarding a case where the controller 21 uploads the setting data at a demand from the management server 10, instead of uploading the setting data voluntarily. In response to the demand from the management server 10, the collection part 101 makes a demand to the controller 21 for the setting data. In response to the demand, the controller 21 transmits the setting data to the collection part 101. In this manner, the collection part 101 collects the setting data. When the robot system 20 includes a plurality of controllers 21, the collection part 101 collects the setting data from each of the plurality of controllers 21.

The collection part 101 collects the setting data when a predetermined condition(s) is met. The predetermined condition(s) may be any condition(s) specified for collection of the setting data. In the first embodiment, one predetermined condition is that backup time has come. Another possible example is that an alarm occurs in the controller 21. Another possible example is that trace data of a torque signal associated with the robot 22 has turned into a predetermined state. Another possible example is that the user or the worker has made a command for a backup.

The backup time may be stored in advance in the data storage 100, and any point of time may be set as the backup time. In one example, the backup time may be the same point of time daily or may vary from week to week. It is to be noted that a backup may not necessarily be obtained daily; for example, a backup may be scheduled to be obtained at time intervals of a few to several days or may be scheduled to be obtained in business days on which the factor operates.

The collection part 101 obtains knowledge of the present date and time using a real-time clock, a GPS signal, or similar means, and determines whether predetermined backup time has come. When the collection part 101 determines that the predetermined backup time has come, the collection part 101 makes a demand to the controller 21 for the setting data. It is to be noted that the backup time may be set to be common to all the controllers 21 or may be set to vary from controller 21 to controller 21. Upon collecting the setting data from the controller 21, the collection part 101 stores the setting data in the controller database DB as a backup.

Determination Part

Based on the setting data at each time point of the plurality of time points, the determination part 102 determines whether a change has been made to the setting data. Specifically, the determination part 102 compares the setting data collected at a first time point with the setting data collected at a second time point different from the first time point. Based on the comparison, the determination part 102 determines whether a change has been made to the setting data. In other words, when the setting data is collected by the collection part 101, the determination part 102 compares the collected setting data with the setting data collected at an earlier point of time. Based on the comparison, the determination part 102 determines whether a change has been made to the setting data. When the determination part 102 determines that a change is made to the setting data, the determination part 102 stores a first value and the name of the changed setting data in the changed-unchanged information. When the determination part 102 determines that no change is made to the setting data, the determination part 102 stores a second value in the changed-unchanged information.

The first embodiment is regarding a case where the setting data is determined as being changed regardless of whether the change made to the setting data is a major or minor change (that is, the setting data is determined as being changed even if the setting data is changed only partially). In one example, when the latest program code and the previous program code match completely, the determination part 102 determines that no program change is made, while when the latest program code and the previous program code do not match completely, the determination part 102 determines that a program change is made. In another example, when a new program is added to the setting data or an existing program in the setting data is deleted, the determination part 102 determines that a program change is made. In another example, when the latest parameter value(s) and the previous parameter value(s) match completely, the determination part 102 determines that no parameter change is made, while when the latest parameter value(s) and the previous parameter value(s) do not match completely, the determination part 102 determines that a parameter change is made. In another example, when a new parameter is added to the setting data or an existing parameter in the setting data is deleted, the determination part 102 determines that a parameter change is made. It is to be noted that as in a modification described later, it is possible to determine that no change is made to the setting data when a predetermined change has not been made.

In the first embodiment, the determination part 102 determines, at every backup time, whether a change has been made to the setting data. For this purpose, the determination part 102 includes a backup determination part 102A. The backup determination part 102A determines, based on setting data collected for backup purposes, whether a change has been made to the setting data. Specifically, when the collection part 101 has collected backup target setting data, the backup determination part 102A compares the backup target setting data with backup target setting data obtained at an earlier point of time, and based on the comparison, determines whether a change has been made to the setting data. It is to be noted that the backup determination part 102A may perform the above determination after the setting data is stored into the controller database DB (that is, after a backup has been completed), or may perform the above determination after before the setting data is stored into the controller database DB (that is, before a backup is completed).

Change Information Outputting Part

When the determination part 102 determines that a change is made to the setting data, the change information outputting part 103 outputs change information. The change information is regarding the change made to the setting data. The change information may be any information insofar as the information is regarding the change made to the setting data. Examples of the change information include, but are not limited to: change content information, which is regarding a content of the change made to the setting data; and change kind information, which is regarding a kind of the setting data to which the change is made. Other examples of the change information include: the point of time at which the change was made to the setting data; the fact that the change is made to the setting data; the person who made the change to the setting data; the controller 21 whose setting data is changed; and the robot 22 that operates based on the changed setting data.

The change content information is information regarding a content of the change made to the setting data. The content of the change may be a position on the setting data to which the change was made, or may be a part of the setting data to which the change was made. In one example, when a change is made to a program, the change content information denotes a program code that is added, changed, or deleted. In another example, when a change is made to a parameter, the change content information denotes the amount of the change made to the parameter. It is to be noted that when the setting data is a parameter file in which a plurality of parameters are stored, the change content information may denote the parameter in the parameter file to which the change is made. In one example, when a plurality of kinds of parameters are stored in a parameter file, the change content information may denote the kind of the parameter in the parameter file to which the change is made. In another example, when values of a parameter are stored in time order in a parameter file, the change content information may denote the point of time in the parameter file at which the change was made to the parameter.

The change kind information is information regarding the kind of the setting data to which a change is made. In one example, when a change is made to a program, the change kind information denotes the name of the program (file name of the program) to which the changed is made. In another example, when a change is made to a parameter, the change kind information denotes the name of the parameter (file name of the parameter) to which the changed is made. It is to be noted that the kind(s) of the setting data may be identified by other identification information such as ID.

While the first embodiment is regarding a case where the change information output onto screen in a visually recognizable manner, the change information may be output in the form of sound or data (file output). When the change information is output in the form of data output, the change information is output to and recorded in an external device or a memory in the form of data. In this case, the change information may be output in any data form, examples including, but not limited to, image form, text form, document form, tabular form, csv form, and message form. Another possible example that a message including the change information may be sent, which may be regarded as an output of the change information.

In the first embodiment, example information output as the change information is change content information. For this purpose, the change information outputting part 103 includes a content outputting part 103A. When the determination part 102 determines that a change is made to the setting data, the content outputting part 103A outputs the change content information (which is regarding a content of the change made to the setting data) as the change information. For example, the content outputting part 103A compares pre-change setting data with post-change setting data to identify a content of the change, and outputs the change content information such that the change content information denotes the content of the change that is identified. Thus, the content outputting part 103A identifies the difference between the pre-change setting data and the post-change setting data, and obtains the change content information. While in the first embodiment all the difference is obtained as the change content information, only part of the difference may be obtained as the change content information, as in a modification described later.

In one example, the content outputting part 103A compares a character string in the program code of the pre-change program with a character string in the program code of the post-change program to identify an unmatched part of the character strings; regards the unmatched part as a content of the change; and outputs the change content information such that the change content information denotes the unmatched part. In another example, the content outputting part 103A compares a pre-change parameter value with a post-change parameter value to obtain the difference; regards the difference as a content of the change; and outputs the change content information such that the change content information denotes the difference. In the first embodiment, the content outputting part 103A displays, on the change information screen G3, a content of a change made to a program code and/or a content of a change made to a parameter.

In the first embodiment, another example information output as the change information is change kind information. For this purpose, the change information outputting part 103 includes a kind outputting part 103B. In the controller 21, a plurality of kinds of setting data are changeable. When the determination part 102 determines that a change is made to the setting data, the kind outputting part 103B outputs the change kind information (which is regarding the kind of the setting data to which the change is made) as the change information. The determination part 102 is capable of determining, on a setting data kind basis, whether a change has been made to the setting data. When the determination part 102 has made such determination, the kind outputting part 103B outputs the change kind information such that the change kind information denotes the kind of the setting data that the determination part 102 determines as being changed. For example, the kind outputting part 103B outputs, as the change kind information, the name of a program that the determination part 102 determines as being changed. In the first embodiment, the kind outputting part 103B displays, on the change-lists screen G2 and the change information screen G3, the name of the program that is changed.

Transmission Part

When the determination part 102 determines that a change is made to the setting data, the transmission part 104 transmits a change notification to a predetermined destination. As used herein, the term "destination" refers to the name of a place, an element, or a person to which information, including a notification, is addressed. The change notification may be any information electronically transmittable through a network. Examples of means of notification include, but are not limited to, message application, short message service (SMS), social networking service (SNS), and push notification technology, as described above.

When electronic mail is used, the destination may be the address of the electronic mail or a user name related to the address. When short message service (SMS) is used, the destination may be a telephone number or a user name related to the telephone number. When social networking service (SNS) is used, the destination may be the account of the user or a user name related to the account. When push notification is used, the destination may be IP address of the user terminal 30 or individual identification information.

While the destination may be common to all the controllers 21, the first embodiment is regarding a case where the destination is set on an individual controller 21 basis. In light of this, the transmission part 104 sends, as the change notification, an electronic mail to a destination determined by the decision part 105, described later. In this respect, it will be assumed that the format of the electronic mail is stored in advance in the data storage 100. In one example, the electronic mail may show that a change is made to the setting data. In another example, the electronic mail may show a hyperlink to the main screen G1, the change-lists screen G2, or the change information screen G3. In another example, the electronic mail may show information similar to the change information screen G3 and may include at least one information among the change content information and the change kind information. It is to be noted that when a plurality of pieces of the setting data have been changed, the transmission part 104 may send electronic mails respectively corresponding to the number of the changes that have been made, or may send a single electronic mail corresponding to the changes.

Decision Part

The decision part 105 determines a destination of the change notification based on the controller 21 whose setting data is changed. The first embodiment is regarding a case where relationships between the controllers 21 and destinations is stored in the controller database DB. The relationships, however, may be stored in some other database. The decision part 105 refers to the controller database DB and determines a destination based on mail setting information on the controller 21 whose setting data is changed. The transmission part 104 transmits the change notification to the destination that is determined. It is to be noted that the change notification may be transmitted at any desired timing. In one example, the change notification may be transmitted immediately after a change to the setting data is detected. In another example, the change notification may be transmitted upon elapse of a predetermined period of time after a change to the setting data is detected.

1-4. Processings Performed in Industrial Machine Management System

Processings performed in the industrial machine management system 1 will be described. The following description is regarding backup processing and screen display processing. In the backup processing, the management server 10 obtains a backup of the setting data. In the screen display processing, various screens are displayed on the user terminal 30. These processings are example processings performed by the functional blocks illustrated in FIG. 6.

Backup Processing

Figure 8:
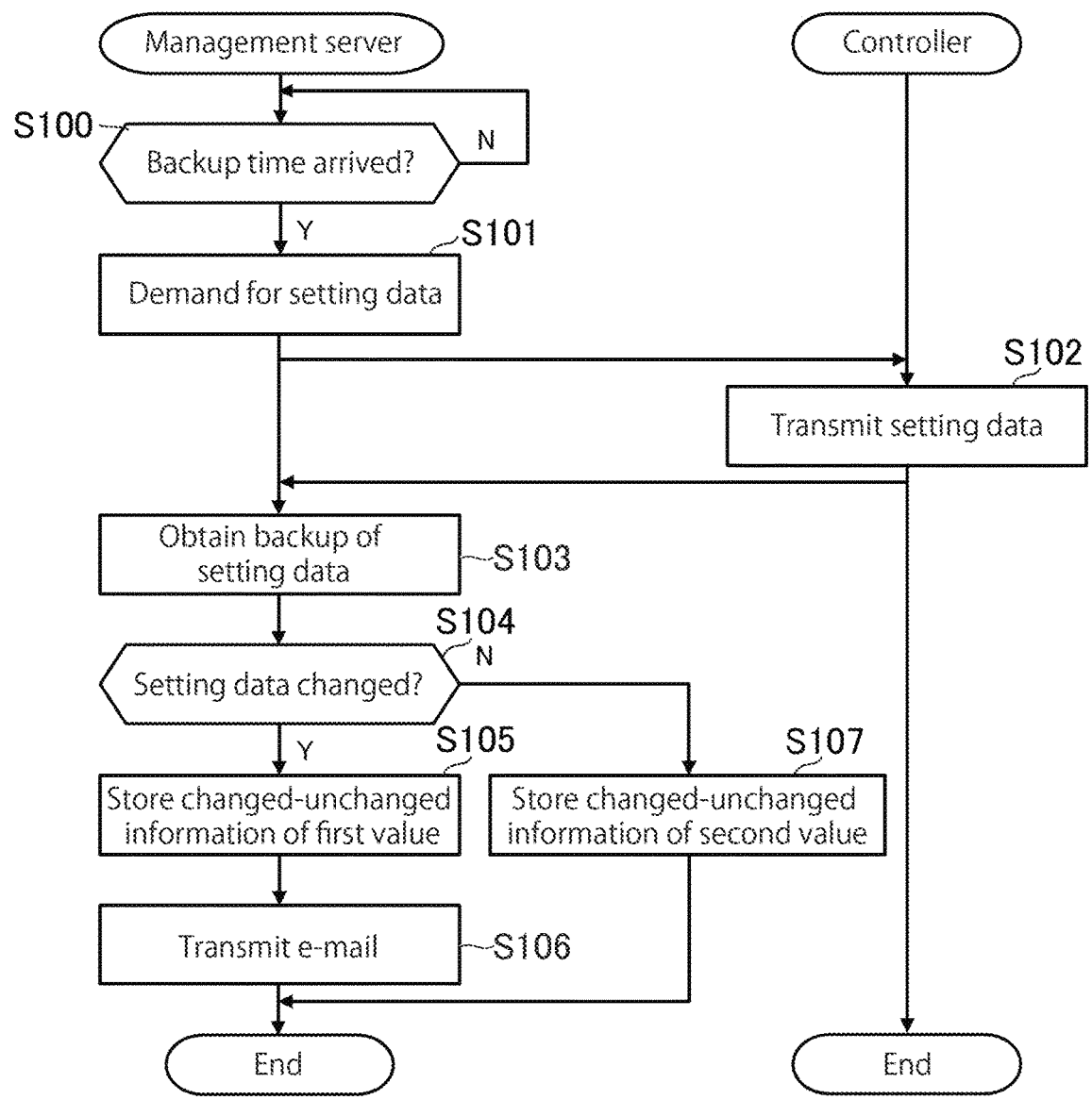
FIG. 8 is a flow chart of backup processing.

FIG. 8 is a flow chart of the backup processing performed in the first embodiment. The backup processing illustrated in FIG. 8 is performed by: a central processing unit (CPU) 11 of the management server 10 when the CPU 11 operates according to a program stored in the storage 12; and the controller 21 when the controller 21 operates according to a program stored in the controller 21.

As illustrated in FIG. 8, the CPU 11 of the management server 10 obtains knowledge of the present date and time using a real-time clock, a GPS signal, or similar means, and determines whether backup time has come (S100). It will be assumed that the backup time is stored in advance in the storage 12. When the CPU 11 determines the backup time has not come yet (S100: N), the processing at S100 is performed again.

When the CPU 11 determines that the backup time has come (S100: Y), the CPU 11 makes a demand to the controller 21 for the setting data (S101). The demand for the setting data may be made by transmitting predetermined form data. When there are a plurality of controllers 21, the CPU 11 makes a demand to each of the controllers 21 for the setting data at S101. It is to be noted that all the controllers 21 may not necessarily be regarded as backup targets; some of the controllers 21 may be regarded as backup targets.

Upon receipt of the demand for the setting data, the controller 21 transmits setting data stored in a storage of the controller 21 (S102). At S102, the controller 21 transmits all the backup target setting data together with information for identifying the controller 21 (for example, the name of the controller 21). It is to be noted that the backup target may not necessarily be all the setting data stored in the controller 21; some of the setting data may be regarded as the backup target.

Upon receipt of the set data from the controller 21, the CPU 11 of the management server 10 stores the setting data into the controller database DB and obtains a backup of the setting data (S103). At S103, the CPU 11 stores the setting data by relating the setting data with the name of the controller 21 from which the setting data is transmitted, and obtains a backup of such setting data. In this respect, the CPU 11 stores the present date and time as backup date and time.

The CPU 11 compares the setting data received at S103 (the latest backup of setting data) with a past backup of setting data (the most previous or earlier backup of setting data), and based on the comparison, determines whether a change has been made to the setting data (S104). At S104, the CPU 11 determines whether program codes or parameter values match. The first embodiment is regarding a case where the determination at S104 is "Yes" when a change is made to at least one piece of the setting data. Another possible example is that the determination at S104 is "Yes" when a change is made to a particular piece of the setting data. Still another possible example is that the determination at S104 is "Yes" when the number of the setting data that is changed is outside a reference range.

When the CPU 11 determines that a change is made to the setting data (S104: Y), the CPU 11 stores changed-unchanged information having a first value into the controller database DB (S105). Then, based on the mail setting information in the controller database DB, the CPU 11 transmits an electronic mail (S106), thus ending the processing. At S105, the CPU 11 sets a first value in the changed-unchanged information of the controller 21 from which the setting data is transmitted. Then, the CPU 11 stores the name of the changed setting data. At S106, the CPU 11 transmits the electronic mail to the destination indicated by the mail setting information of the controller 21.

When the CPU 11 determines that no change is made to the setting data (S104: N), the CPU 11 stores changed-unchanged information having a second value into the controller database DB (S107), thus ending the processing. At S107, the CPU 11 sets a second value in the changed-unchanged information of the controller 21 from which the setting data is transmitted. In this case, since no change is made to the setting data, no electronic mail is sent.

Screen Display Processing

Figure 9:
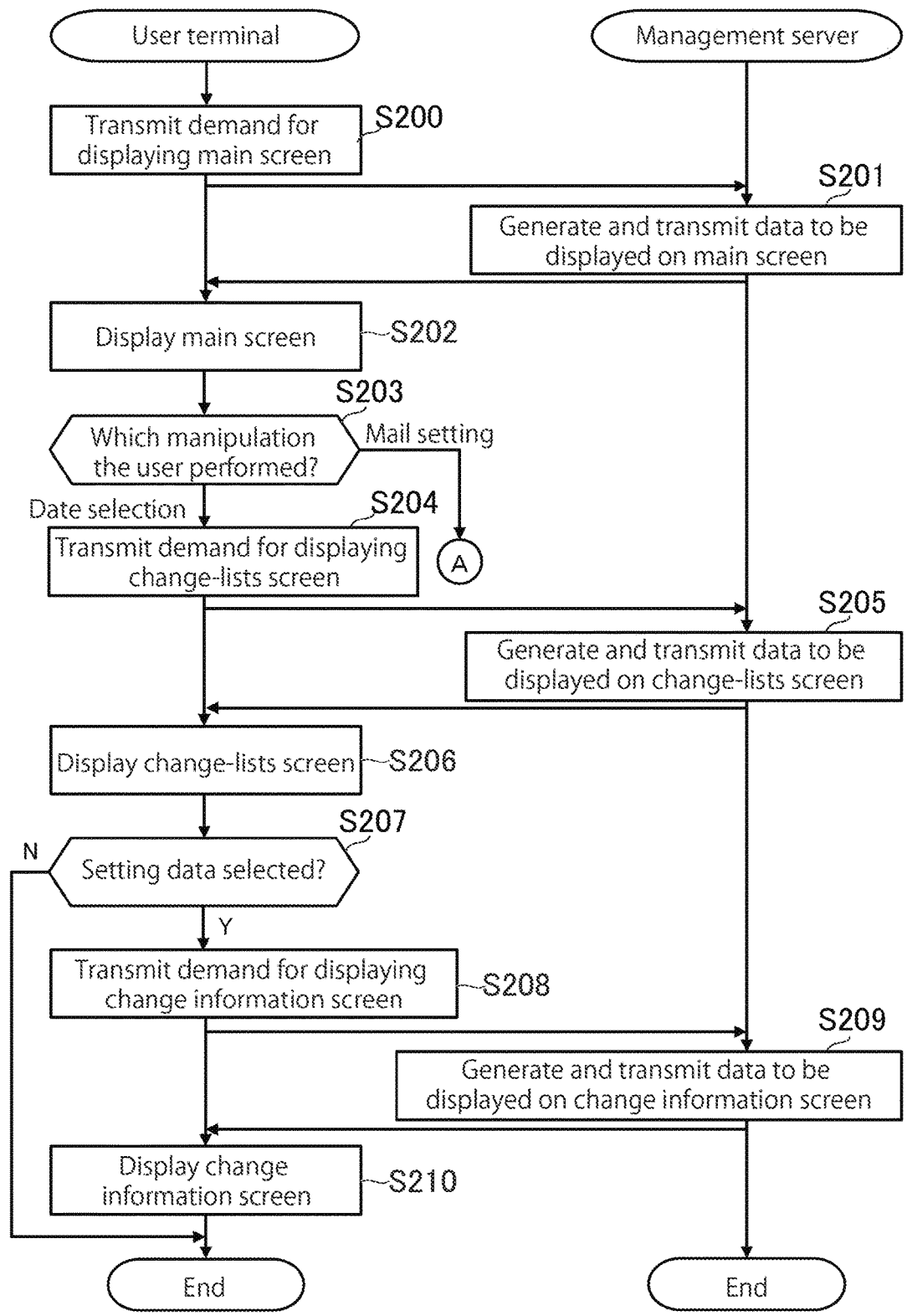
FIG. 9 is a flow chart of screen display processing.
Figure 10:
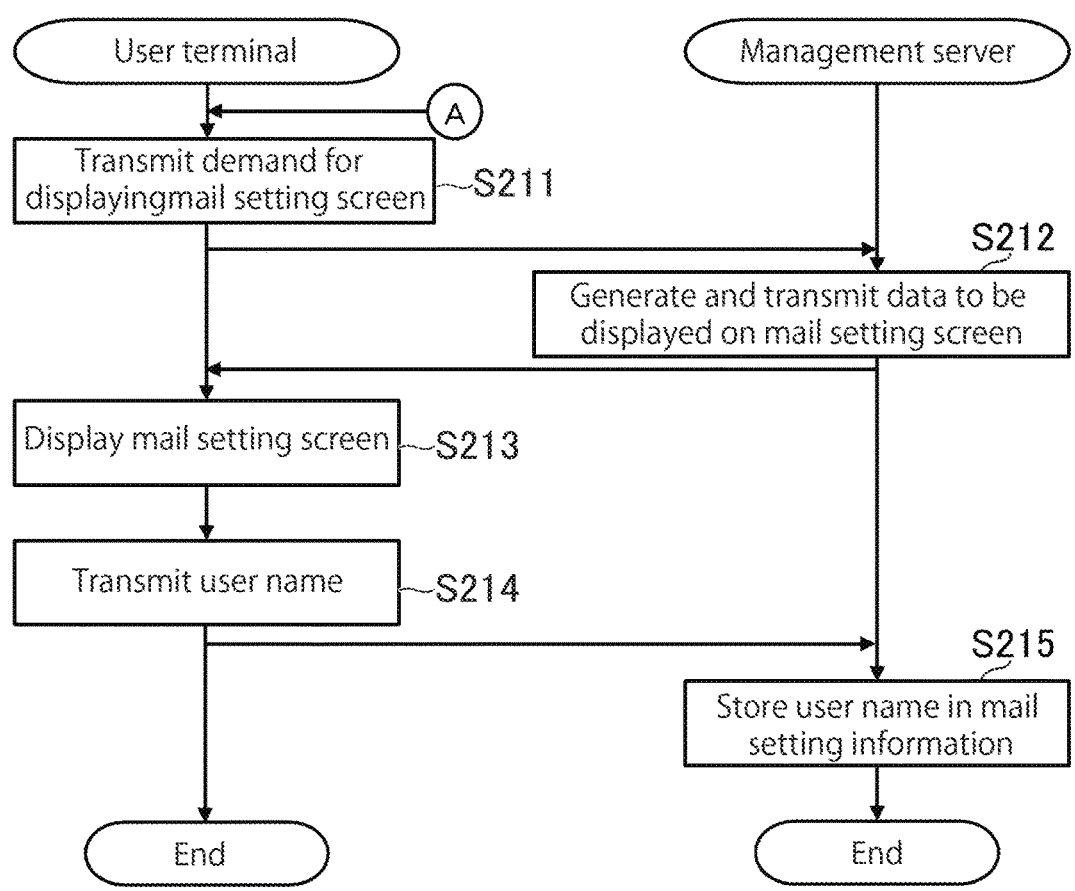
FIG. 10 is a flow chart of screen display processing.

FIGS. 9 and 10 are flow charts of the screen display processing. The screen display processing illustrated in FIGS. 9 and 10 is performed by: the CPU 11 of the management server 10 when the CPU 11 operates according to a program stored in the storage 12; and the CPU 31 of the user terminal 30 when the CPU 31 operates according to a program stored in the storage 32.

As illustrated in FIG. 9, the CPU 31 of the user terminal 30 transmits to the management server 10 a demand for displaying the main screen G1 (S200). The demand for displaying the main screen G1 may be made by transmitting predetermined form data. In one example, when the main screen G1 is displayed on a web browser, the demand may contain a universal resource locator (URL). In another example, when the main screen G1 is displayed on an application, the demand may contain identification information of the main screen G1. The same applies in the demands for displaying the other screens, described later.

Upon receipt of the demand for displaying the main screen G1, the CPU 11 of the management server 10 generates, based on the controller database DB, data to be displayed on the main screen G1, and transmits the data to the user terminal 30 (S201). At S201, the CPU 11 refers to the controller database DB and determines whether changed-unchanged information having a first value exists in the controller database DB. When changed-unchanged information having a first value exists in the controller database DB, the CPU 11 generates data to be displayed on the main screen G1 so that backup date and time related to the changed-unchanged information is selectable on the main screen G1.

It is to be noted that when a plurality of pieces of changed-unchanged information of the controller 21 have a first value, it is possible to make the most previous backup date and time selectable on the main screen G1 or make selectable the backup dates and times corresponding to all or some of the changed-unchanged information having a first value. It will be assumed that the data to be displayed on the main screen G1 includes the name of the controller 21, which is managed by the user.

Upon receipt of the data to be displayed on the main screen G1, the CPU 31 of the user terminal 30 causes the display part 35 to display the main screen G1 based on the received data (S202). The CPU 31 receives a detection signal from the operation part 34 and, based on the detection signal, identifies the user's manipulation of the operation part 34 (S203). It will be assumed that the manipulation at S203 is selecting of one of the date T10 and the button B11.

When the date T10 displayed on the main screen G1 is selected (S 203; date selected), the CPU 31 transmits a demand for displaying the change-lists screen G2 (S204). It will be assumed that the demand transmitted at S204 includes the name of the controller 21 corresponding to the date T10 that is selected.

Upon receipt of the demand for displaying the change-lists screen G2, the CPU 11 of the management server 10 generates, based on the controller database DB, data to be displayed on the change-lists screen G2, and transmits the data to the user terminal 30 (S205). At S205, the CPU 11 obtains, from the controller database DB, a record in which the name of the controller 21 included in the demand for displaying is stored. Then, the CPU 11 generates the data to be displayed on the change-lists screen G2 such that the data denotes a list of the backup date and time of this record and the name of the setting data in which the changed-unchanged information has a first value.

Upon receipt of the data to be displayed on the change-lists screen G2, the CPU 31 of the user terminal 30 causes the display part 35 to display the change-lists screen G2 based on the received data (S206). The CPU 31 receives a detection signal from the operation part 34 and, based on the detection signal, determines whether any of the setting data displayed with dates on the change-lists screen G2 has been selected (S207). When the CPU 31 determines that no setting data is selected (S207: N), the processing ends.

When the CPU 31 determines that any of the setting data is selected (S207: Y), the CPU 31 transmits a demand for displaying the change information screen G3 so that the change information screen G3 displays the change information of the selected setting data (S208). It will be assumed that the demand transmitted at S208 includes the name and date of the selected setting data.

Upon receipt of the demand for displaying the change information screen G3, the CPU 11 of the management server 10 generates, based on the controller database DB, data to be displayed on the change information screen G3, and transmits the data to the user terminal 30 (S209). At S209, the CPU 11 refers to the controller database DB and generates the change information based on the setting data corresponding to the name and date included in the demand. For example, the CPU 11 generates the data to be displayed on the change information screen G3 such that the setting data from which a backup was obtained on the date can be compared with the setting data from which a backup was obtained on an earlier date.

Upon receipt of the data to be displayed on the change information screen G3, the CPU 31 of the user terminal 30 causes the display part 35 to display the change information screen G3 based on the received data (S210), thus ending the processing. At S210, in response to the selecting of the setting data by the user on the change-lists screen G2, the CPU 31 causes the change information screen G3 to display a content of the change made to the setting data on the date selected by the user.

When the button B11 is selected at S203 (S 203; mail setting), the CPU 31 transmits a demand for displaying the mail setting screen G4 (S211), as illustrated in FIG. 10. It will be assumed that the demand transmitted at S211 includes the name of the controller 21 subjected to mail setting.

Upon receipt of the demand for displaying the mail setting screen G4, the CPU 11 of the management server 10 generates, based on the controller database DB, data to be displayed on the mail setting screen G4, and transmits the data to the user terminal 30 (S212). At S212, the CPU 11 refers to the controller database DB and, based on the mail setting information related to the name of the controller 21 included in the demand for displaying, generates the data to be displayed on the mail setting screen G4. For example, when a user name is already stored in the mail setting information, the CPU 11 turns the check box B40 of the user into checked state.

Upon receipt of the data to be displayed on the mail setting screen G4, the CPU 31 of the user terminal 30 causes the display part 35 to display the mail setting screen G4 based on the received data (S213). The CPU 31 receives a detection signal from the operation part 34 and, based on the detection signal, transmits a user name selected as a notification target (S214). At S214, the CPU 31 transmits a user name checked in the check box B40.

Upon receipt of the user name selected as a notification target, the CPU 11 of the management server 10 stores the user name in the mail setting information (S215), thus ending the processing. At S215, the CPU 11 adds the name selected by the user to the mail setting information and sets, as a destination, the user corresponding to the selected name. It is to be noted that when the user has turned the check box B40 into unchecked state, the name corresponding to the check box B40 and stored in the mail setting information is also deleted.

The industrial machine management system 1 according to the first embodiment determines whether a change has been made to setting data collected from the controller 21. When the industrial machine management system 1 determines that the change is made to the setting data, the industrial machine management system 1 outputs change information. Outputting the change information makes the user more likely to be aware of the change made to the setting data, enabling the user to more readily manage the change made to setting data. For example, even if someone has made a change to the setting data without the user's knowing, outputting the change information makes the user aware of the change made to the setting data. For example, when a predetermined event (such as an alarm) occurs in the controller 21, the user analyzing what caused the event to occur may find that the event has something to do with a change in the setting data of the controller 21. In light of this, outputting the change information assists the user in the user's analysis for the cause of the event. If the controller 21 is allowed to transmit its setting data voluntarily, it is possible for the controller 21 to transmit its setting data when it is not necessary to determine whether a change has been made to the setting data. This may increase the processing load on the management server 10 and the controller 21, and increase the communication load on the network. In light of this, it is the management server 10 that collects the setting data to determine whether a change has been made to the setting data. This ensures that the setting data is transmitted to the management server 10 only when there is a need for the setting data. This saves the processing load on the management server 10 and the controller 21 and the communication load on the network. Also, the collection of the setting data from the controller 21 and the determination as to whether a change has been made to the setting data are performed on the server side. This eliminates the need for determining whether a change has been made to the setting data on the controller 21 side, saving the processing load on the controller 21.

Also, when the management server 10 determines that a change is made to the setting data, the management server 10 outputs change content information, which is regarding a content of the change made to the setting data. Outputting the change content information makes the user more likely to be aware of the content of the change made to the setting data, enabling the user to more readily manage the content of the change made to the setting data. For example, when a predetermined event (such as an alarm) occurs in the controller 21, it is possible that the event has something to do with a change made to a particular position on the setting data. In light of this, outputting the change content information effectively assists the user in the user's analysis for the cause of the event.

Also, when the management server 10 determines that a change is made to the setting data, the management server 10 outputs change kind information, which is regarding the kind of the setting data to which the change is made. Outputting the change kind information makes the user more likely to be aware of the kind of the setting data to which the change is made, enabling the user to more readily manage the change made to the setting data. For example, when a predetermined event (such as an alarm) occurs in the controller 21, it is possible that the event has something to do with a change made to a particular kind of the setting data. In light of this, outputting the change kind information effectively assists the user in the user's analysis for the cause of the event.

Also, when the management server 10 determines that a change is made to the setting data, the management server 10 transmits a change notification to a predetermined destination. This makes the user more likely to be aware of the change made to the setting data.

Also, when the management server 10 determines that a change is made to the setting data, the management server 10 determines a destination of a change notification based on the controller 21, so that the change notification is transmitted to a destination corresponding to the controller 21. Thus, a change notification is transmitted to an optimal user determined based on the controller 21. For example, when the controllers 21 are managed by different users, a change notification is transmitted to the user who manages the controller 21 whose setting data is changed.

Also, the setting data that is collected from the controller 21 for backup purposes can also be subjected to a determination as to whether a change has been made to the setting data. That is, it is not necessary to collect the setting data only for the purpose of determining whether a change has been made to the setting data. This more efficiently saves the processing load on the controller 21 and the management server 10 and the communication load on the network.

2. Second Embodiment

According to the inventors' knowledge and experience, if changes are made to setting data of industrial machines, the industrial machines may be affected in lifetime and load factor, among other aspects. Also, if a change is made to setting data of by an industrial machine by a worker at the site where the industrial machine is located, the industrial machine may be affected without the user's knowing. In light of the considerations above, the inventors conducted extensive studies in an attempt to inform the user of an influence(s) that a change made to the setting data of an industrial machine can have on the industrial machine, and as a result, have conceived of a novel and unique industrial machine management system and a related machine and a related method. An industrial machine management system and a related machine and a related method according to the second embodiment will be described in detail below.

It is to be noted that the industrial machine management system 1 according to the second embodiment may have a general arrangement similar to the general arrangement illustrated in FIG. 1. In the following description, those respects in which the second embodiment is similar or identical to the first embodiment will not be elaborated upon. It is also to be noted that while the industrial machine management system 1 according to the second embodiment has the functions described in the first embodiment, the functions described in the first embodiment may be omitted in the second embodiment. That is, the industrial machine management system 1 according to the second embodiment may not necessarily output change information, but may only output information regarding an influence(s) of change made to the setting data.

2-1. Outline of Industrial Machine Management System

FIG. 11 illustrates an example change information screen G3 according to the second embodiment. As illustrated in FIG. 11, the change information screen G3 displays: lifetime and load factor in the case where the controller 21 causes the robot 22 to operate according to pre-change setting data; and lifetime and load factor in the case where the controller 21 causes the robot 22 to operate according to post-change setting data. In the example illustrated in FIG. 11, the displayed lifetime is calculated based on load factor of a reducer of the robot 22 and how much the reducer is worn, and the displayed load factor is calculated based on a torque signal detected by a torque sensor of the robot 22.

It is to be noted that if the post-change setting data causes the lifetime to be shortened and/or the load factor to increase, it is possible to emphasize the lifetime and/or the load factor in the manner described in the first embodiment. In the example illustrated in FIG. 11, an emphasis is made by underlining. In another possible example, an emphasis may be made in color and/or a different font size.

Also, the information displayed on the change information screen G3 will not be limited to lifetime and load factor, but may be any other information that is regarding an influence(s) of change made to the setting data. Examples of information that may be displayed on the change information screen G3 include, but are not limited to, maximum torque, a convergence value of a torque signal, the rising timing of the torque signal, the convergence timing the torque signal, position information regarding the position of a motor, speed information regarding the speed of the motor, the amount of overshoot, and settling time. These pieces of information are obtained before and after the setting data is changed, and are displayed on the change information screen G3.

Other examples of information that may be displayed on the change information screen G3 include, but are not limited to, the period of time spent in work (work duration) and workpiece quality. These pieces of information are obtained before and after the setting data is changed, and are displayed on the change information screen G3. The period of time spent in work may be displayed in the form of "tact time" or "cycle time". The period of time spent in work may be determined based on a camera image or based on the position of an object (workpiece) moved on a belt conveyor. In the latter case, the position of the object may be detected by a sensor or a holding sensor disposed on the hand of the robot 22. Other examples of an influence that may be displayed on the change information screen G3 include, but are not limited to: how much of the CPU or memory of the controller 21 is used; and the load of communication between the controller 21 and the robot 22. Other examples of information that may be displayed on the change information screen G3 include, but are not limited to, the type of an alarm or the number of alarms occurring the controller 21.

Thus, in the second embodiment, when a change is made to the setting data of the controller 21, information such as lifetime and load factor is displayed on the change information screen G3 as influences of the change made to the setting data. In this manner, the user is informed of influences of a change made to the setting data. The industrial machine management system 1 according to the second embodiment will be described in detail below.

2-2. Functions of Industrial Machine Management System

Figure 12:
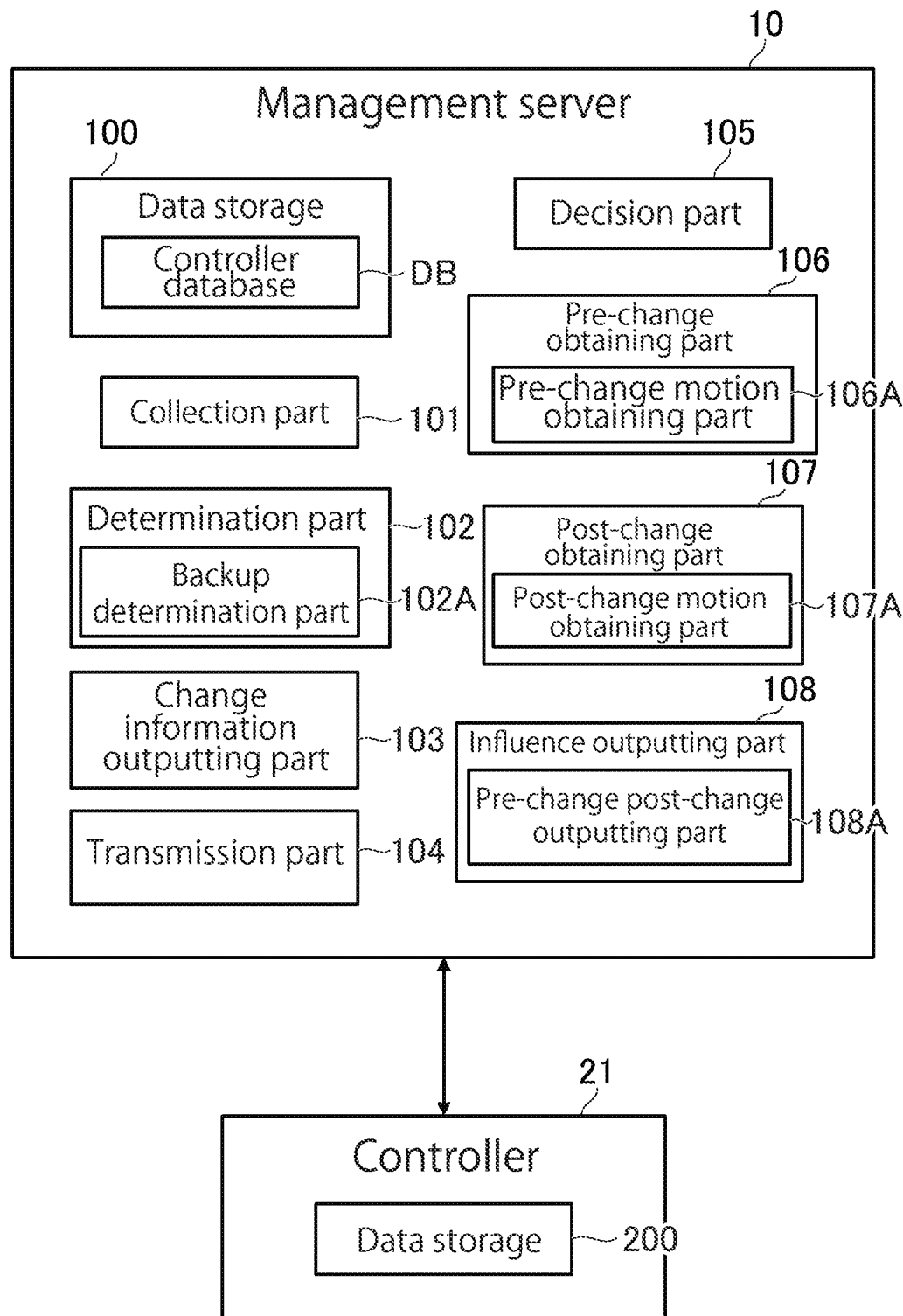
FIG. 12 is a functional block diagram of functions of the industrial machine management system according to the second embodiment.

FIG. 12 is a functional block diagram of functions of the industrial machine management system 1 according to the second embodiment. As illustrated in FIG. 12, the controller 21 includes a data storage 200. This data storage 200 is similar to the data storage 200 according to the first embodiment. Also, among the functions implemented in the management server 10 according to the second embodiment, the data storage 100, the collection part 101, the determination part 102, the change information outputting part 103, the transmission part 104, and the decision part 105 are similar to their respective counterparts of the first embodiment. The controller database DB, however, is different from the controller database DB according to the first embodiment. The following description is regarding: the controller database DB according to the second embodiment; and a pre-change obtaining part 106, a post-change obtaining part 107, and an influence outputting part 108, which are implemented in the management server 10 according to the second embodiment. These functions are mainly implemented by the CPU 11.

Controller Database

FIG. 13 illustrates an example of how data is stored in the controller database DB according to the second embodiment. As illustrated in FIG. 13, the controller database DB stores state information regarding a state of the controller 21 or the robot 22. As used herein, the term "state" refers to a motion status of the controller 21 or the robot 22, or information obtained by estimation of the motion status. The motion status may be detected by a sensor or a camera provided in the robot system 20. Examples of the motion status include, but are not limited to, a waveform of a torque signal, maximum torque amount, a convergence value of the torque signal, the rising timing of the torque signal, the convergence timing of the torque signal, position information regarding the position of a motor, speed information regarding the speed of the motor, the amount of overshoot, settling time, CPU usage, memory usage, communication traffic volume, and alarm information.

The state information may be a motion status detected by a sensor or a camera, or may be information obtained by estimation of the motion status. As used herein, the term "estimation" is equivalent to "evaluation", and examples of the information obtained by evaluation of the motion status include, but are not limited to: performance of the controller 21 or the robot 22; and a result of diagnosis of the controller 21 or the robot 22. For example, the state information is regarding at least one of lifetime, load factor, the period of time spent in work, and motion status associated with the controller 21 or the robot 22. These pieces of information are information as of time before a change is made to the setting data. The state information may be obtained by a simulation, without actually operating the controller 21 and the robot 22. In this embodiment, however, the state information is based on measurements obtained by actually operating the controller 21 and the robot 22. The state information may be information as of a point of time, or may be trace data (logging data) in which pieces of information are stored on a time-series basis.

Pre-Change Obtaining Part

The pre-change obtaining part 106 obtains pre-change information when the management server 10 determines that a change is made to the setting data. The pre-change information is regarding a state of the controller 21 or the robot 22 as of time prior to the change made to the setting data. It is to be noted that the pre-change information may be regarding a state of the controller 21 and a state of the robot 22, or regarding a state of either the controller 21 or the robot 22. In the second embodiment, the state information is stored in the controller database DB, and thus the pre-change obtaining part 106 refers to the controller database DB to obtain, as the pre-change information, state information as of time prior to the change made to the setting data.

In the second embodiment, the pre-change obtaining part 106 includes a pre-change motion obtaining part 106A. The pre-change motion obtaining part 106A obtains the pre-change information based on a motion status of the controller 21 or the robot 22 that is operating according to the pre-change setting data. Specifically, the pre-change motion obtaining part 106A obtains a motion status of the controller 21 or the robot 22 detected by a sensor or a similar device of the robot system 20, and obtains the pre-change information based on the motion status.

In one example, when the pre-change information is regarding lifetime, the pre-change obtaining part 106 obtains a wear status of the motor(s), the hand(s), or another component of the robot 22, thereby obtaining the lifetime of the robot 22. In this case, it will be assumed that a relationship between wear status and lifetime is defined in advance such that the lifetime of the robot 22 is shortened as a component of the robot 22 is worn. In another example, when the pre-change information is regarding load factor, the pre-change obtaining part 106 may calculate the load factor based on a torque signal associated with the robot 22, or may obtain, as the load factor, CPU usage or memory usage in the controller 21.

In another example, when the pre-change information is regarding the period of time spent in work, the pre-change obtaining part 106 obtains the period of time spent in work by analyzing a sensor or a similar device of the robot system 20. It is to be noted that the period of time spent in work may be input by the worker or other personnel. In another example, when the pre-change information is regarding motion status, the pre-change obtaining part 106 obtains a motion status of the controller 21 or the robot 22 detected by a sensor or a similar device of the robot system 20.

Post-Change Obtaining Part

The post-change obtaining part 107 obtains post-change information. The post-change information is regarding a state of the controller 21 or the robot 22 as of time after a change is made to the setting data. It is to be noted that the post-change information may be regarding a state of the controller 21 and a state of the robot 22, or regarding a state of either the controller 21 or the robot 22. In the second embodiment, the state information is stored in the controller database DB, and thus the post-change obtaining part 107 refers to the controller database DB to obtain, as the post-change information, state information as of time after the change made to the setting data.

The post-change information may be a motion status detected by a sensor or a camera, or may be information obtained by estimation of the motion status. For example, the post-change information is regarding at least one of lifetime, load factor, the period of time spent in work, and motion status associated with the controller 21 or the robot 22. These pieces of information are information as of time after a change is made to the setting data. The post-change information may be obtained by a simulation, without actually operating the controller 21 and the robot 22. In this embodiment, however, the post-change information is based on measurements obtained by actually operating the controller 21 and the robot 22.

In the second embodiment, the post-change obtaining part 107 includes a post-change motion obtaining part 107A. The post-change motion obtaining part 107A obtains the post-change information based on a motion status of the controller 21 or the robot 22 that is operating according to the post-change setting data. Specifically, the post-change motion obtaining part 107A obtains a motion status of the controller 21 or the robot 22 detected by a sensor or a similar device of the robot system 20, and obtains the post-change information based on the motion status.

In one example, when the post-change information is regarding lifetime, the post-change obtaining part 107 obtains a wear status of the motor(s), the hand(s), or another component of the robot 22, thereby obtaining the lifetime of the robot 22. In this case, it will be assumed that a relationship between wear status and lifetime is defined in advance such that the lifetime of the robot 22 is shortened as a component of the robot 22 is worn. In another example, when the post-change information is regarding load factor, the post-change obtaining part 107 may calculate the load factor based on a torque signal associated with the robot 22, or may obtain, as the load factor, CPU usage or memory usage in the controller 21.

In another example, when the post-change information is regarding the period of time spent in work, the post-change obtaining part 107 obtains the period of time spent in work by analyzing a sensor or a similar device of the robot system 20. It is to be noted that the period of time spent in work may be input by the worker or other personnel. In another example, when the post-change information is regarding motion status, the post-change obtaining part 107 obtains a motion status of the controller 21 or the robot 22 detected by a sensor or a similar device of the robot system 20.

Influence Outputting Part

The influence outputting part 108 outputs influence information based on the pre-change information and the post-change information. The influence information is regarding an influence(s) of a change made to the setting data. As used herein, the term "influence" refers to an influence that a change made to the setting data has on the controller 21 or to the robot 22. In other words, the term "influence" refers to a change in a state of the controller 21 or the robot 22. When each of the pre-change information and the post-change information is regarding a motion status, a change in the motion status is regarded as an influence. When each of the pre-change information and the post-change information is regarding information obtained by estimation of a motion status, a change in the estimation is regarded as an influence.

The influence information may be any information from which an influence is identifiable. Specifically, the influence information may be information regarding an influence on at least one of lifetime, load factor, the period of time spent in work, and motion status associated with the controller 21 or the robot 22. As in a modification described later, the influence information may be regarding how any of these influenced elements differ before and after the setting data is changed. In this embodiment, however, it will be assumed that the influence information includes the pre-change information and the post-change information. It is to be noted that the influence information may be regarding an influence on the controller 21 and the robot 22 or on either the controller 21 or the robot 22.

The influence outputting part 108 includes a pre-change post-change outputting part 108A. The pre-change post-change outputting part 108A outputs the pre-change information and the post-change information as the influence information, which is regarding an influence(s) of a change made to the setting data. The influence information may be output in a manner similar to the manner in which other information is output in the first embodiment, and in the second embodiment, the influence information is output visually onto a screen. It is to be noted, however, that the influence information may be in the form of sound or data (file output). On the change information screen G3, the pre-change post-change outputting part 108A displays the pre-change information and the post-change information. It is to be noted that the pre-change information and the post-change information may be displayed on separate screens.

2-3. Processings Performed in Industrial Machine Management System

In the second embodiment, the backup processing and the screen display processing described in the first embodiment are performed, partially differently from the first embodiment.

Backup Processing in Second Embodiment

Figure 14:
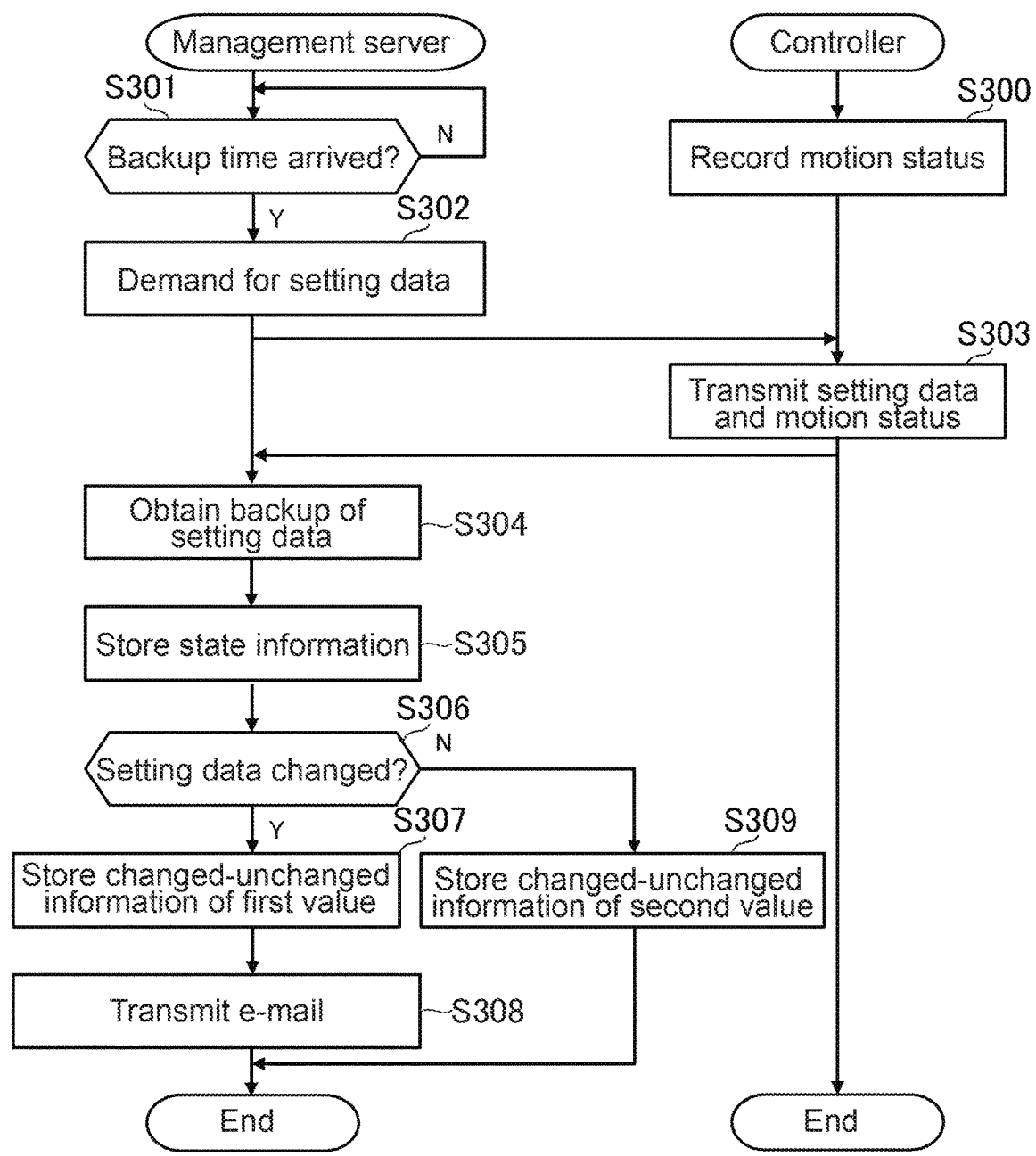
FIG. 14 is a flow chart of backup processing according to the second embodiment.

FIG. 14 is a flow chart of the backup processing performed in the second embodiment. As illustrated in FIG. 14, the controller 21 records a motion status of the controller 21 and a motion status of the robot 22 (S300). At S300, the controller 21 records the motion statuses based on a detection signal from a sensor and/or a state quantity calculated in the controller 21. In one example, the controller 21 may calculate torque as a state quantity and record torque signal waveforms on a time-series basis based on a detection signal from a torque sensor. In another example, the controller 21 may record feedback speeds on a time-series basis based on a detection signal from a motor encoder. The controller 21 may record any of the above-described motion statuses.

S301 and S302 are respectively similar to S100 and S101. Upon receipt of a demand for the setting data, the controller 21 transmits: the setting data stored in the storage of the controller 21; and the motion statuses recorded at S300 (S303). The processing at S303 is different from the processing at S102 in that the controller 21 transmits not only the setting data but also the motion statuses recorded at S300.

Upon receipt of the setting data and the motion statuses from the controller 21, the management server 10 performs the processing at S304, which is similar to the processing at S103, storing the setting data into the controller database DB. The CPU 11 generates the state information based on the motion statuses that have been received, and stores the state information into the controller database DB (S305). At S305, the CPU 11 may store the motion statuses as the state information, without making any changes to the motion statuses; or may estimate lifetime based on the motion statuses and store the lifetime as the state information. It is to be noted that the state information may not necessarily be generated in advance, but may be calculated at the time when screen display processing, described later, is performed. The processings at S306, S307, S308, and S309 are respectively similar to the processings at S104, S105, S106, and S107.

Screen Display Processing in Second Embodiment

Figure 15:
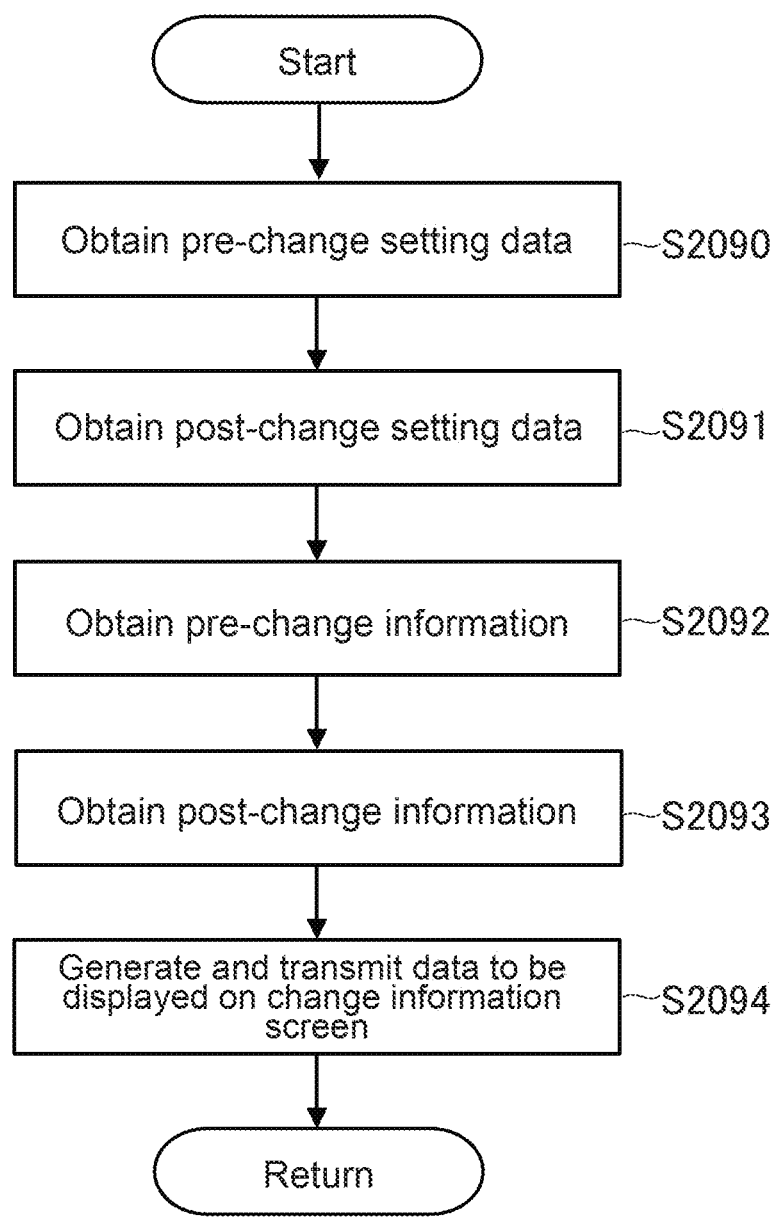
FIG. 15 illustrates details of processing at S209 according to the second embodiment.

The screen display processing performed in the second embodiment is different from the screen display processing performed in first embodiment in the processing at S209, and is otherwise similar to the screen display processing performed in first embodiment. FIG. 15 illustrates details of the processing at S209 according to the second embodiment. As illustrated in FIG. 15, upon receipt of a demand for displaying the change information screen G3, the CPU 11 of the management server 10 obtains the pre-change setting data based on the controller database DB (S2090). At S2090, the CPU 11 refers to the controller database DB and obtains the most previous version of the setting data selected by the user at S207. It is possible to obtain a version that is one version or more versions previous to the most previous version of the setting data.

The CPU 11 obtains the post-change setting data based on the controller database DB (S2091). At S2091, the CPU 11 refers to the controller database DB and obtains the setting data selected by the user at S207. For example, the CPU 11 obtains the latest version of the setting data.

The CPU 11 obtains the pre-change information based on the controller database DB (S2092). At S2092, the CPU 11 refers to the controller database DB and obtains, as the pre-change information, the state information such that the state information is related to the pre-change setting data obtained at S2090. When the state information is described as being related to the setting data, this is intended to mean that the state information is stored in the same record as the record in which the setting data is stored.

The CPU 11 obtains the post-change information based on the controller database DB (S2093). At S2093, the CPU 11 refers to the controller database DB and obtains, as the post-change information, the state information such that the state information is related to the post-change setting data obtained at S2091.

The CPU 11 generates data to be displayed on the change information screen G3 based on the pre-change setting data obtained at S2090, the post-change setting data obtained at S2091, the pre-change information obtained at S2092, and the post-change information obtained at S2093. Then, the CPU 11 transmits the data to the user terminal 30 (S2094). At S2094, the CPU 11 generates data to be displayed on the change information screen G3 such that the data includes the above-described four pieces of information and data (FIG. 11). It is to be noted that if there is an adverse influence such as a shortened lifetime and an increased load factor, the CPU 11 may cause information regarding the adverse influence to be displayed in an emphasized manner. After the CPU 11 has transmitted the data to be displayed on the change information screen G3, the processing at S210 illustrated in FIG. 9 is performed, so that the change information screen G3 is displayed on the user terminal 30.

As has been described hereinbefore, when a change is made to the setting data of the controller 21, the industrial machine management system 1 according to the second embodiment outputs the influence information, which is regarding an influence(s) of the change made to the setting data, based on: the pre-change information, which is regarding a state of the controller 21 as of time before the change made to the setting data; and the post-change information, which is regarding a state of the controller 21 as of time after the change made to the setting data. This ensures that the user is informed of an influence(s) that the change made to the setting data has on the controller 21. This enables the user to more easily determine whether to return the setting data into its pre-change state, keep the current setting data as it is, or set the setting data in some other way. In one example, when it is possible for the post-change setting data to have an adverse influence on the controller 21, the user is informed of the possibility as early as possible after the possibility occurs. This enables the user to prevent in advance the adverse influence on the controller 21. In another example, when the controller 21 fails to operate as desired due to an influence of a change made to the setting data, the user is able to identify the influence that is preventing the controller 21 from operating as desired, since the user is informed of the influence.

Also, the pre-change information (which is regarding a state of the controller 21 as of time before the change made to the setting data) and the post-change information (which is regarding a state of the controller 21 as of time after the change made to the setting data) are output as influences of a change made to the setting data. This facilitates a comparison as to how a state of the controller 21 has changed after the change made to the setting data. This enables the user to more easily determine whether to return the setting data into its pre-change state, keep the current setting data as it is, or set the setting data in some other way.

Also, when the management server 10 determines that a change is made to the setting data, the management server 10 transmits the change notification to a predetermined destination. This makes the user more likely to be aware of the change made to the setting data.

Also, when the management server 10 determines that a change is made to the setting data, the management server 10 determines a destination of a change notification based on the controller 21, so that the change notification is transmitted to a destination corresponding to the controller 21. Thus, a change notification is transmitted to an optimal user determined based on the controller 21. For example, when the controllers 21 are managed by different users, a change notification is transmitted to the user who manages the controller 21 whose setting data is changed.

Also, when a change is made to the setting data, the change information is output. Outputting the change information makes the user more likely to be aware of the change made to the setting data, enabling the user to more readily manage the change made to setting data.

Also, the management server 10 obtains the pre-change information based on a motion status of the controller 21 that is operating according to the pre-change setting data; and obtains the post-change information based on a motion status of the controller 21 that is operating according to the post-change setting data. Thus, the management server 10 obtains the pre-change information and the post-change information based on actual operations of the controller 21. This ensures that an influence(s) that the change made to the setting data has on the controller 21 is output more accurately.

Also, when a change is made to the setting data of the controller 21, the management server 10 outputs information regarding an influence on at least one of lifetime, load factor, the period of time spent in work, and motion status the controller 21 or the robot 22. Thus, the management server 10 informs the user of an influence on at least one of lifetime, load factor, the period of time spent in work, and motion status associated with the controller 21 or the robot 22.

3. Modifications

Figure 16:
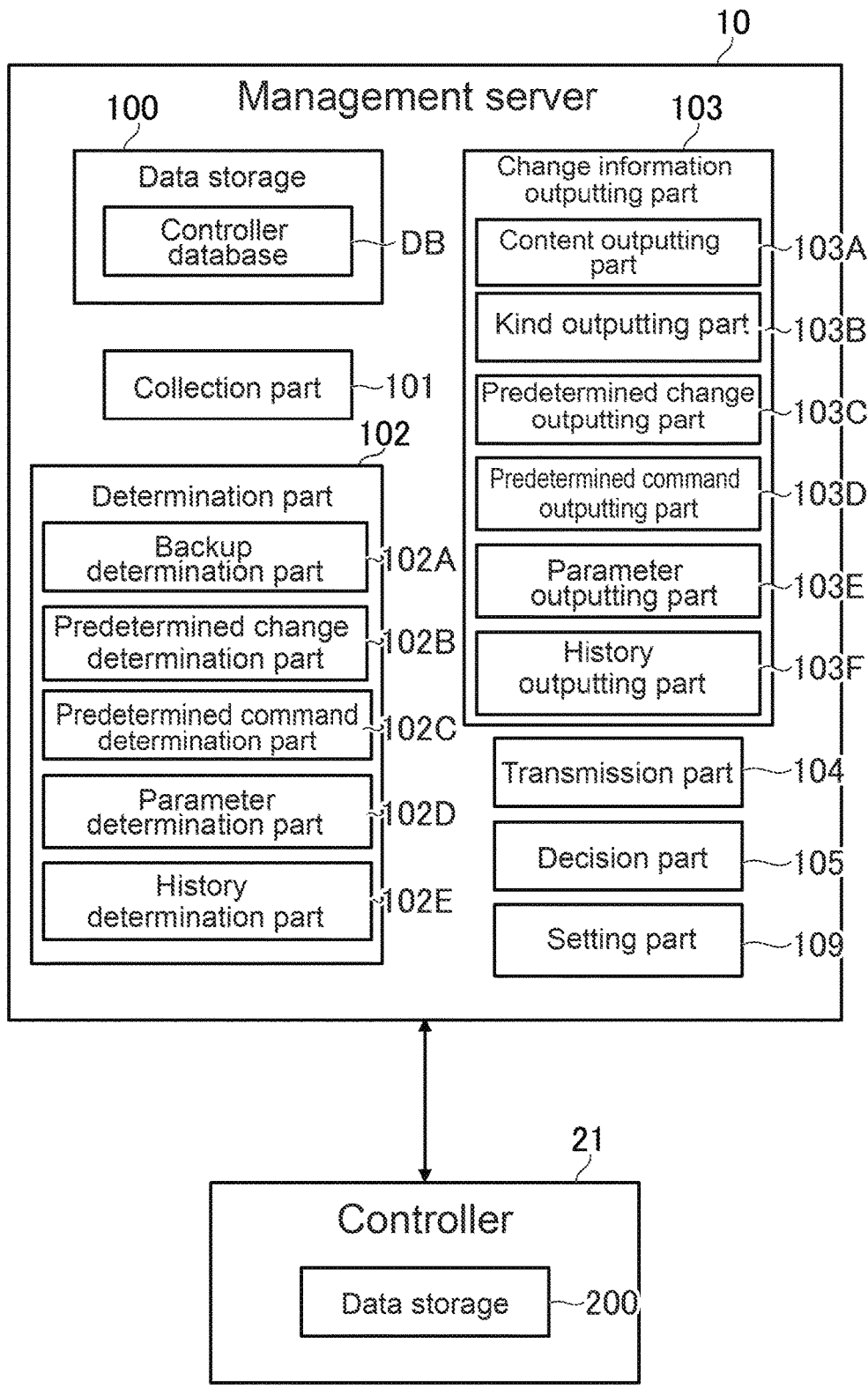
FIG. 16 is a functional block diagram of modifications of the first embodiment.

Modifications of the above-described embodiments will be described below.
3-1. Modifications of First Embodiment Modifications of the first embodiment will be described. FIG. 16 is a functional block diagram of modifications of the first embodiment. As illustrated in FIG. 16, the modifications of the first embodiment include a predetermined change determination part 102B, a predetermined change outputting part 103C, a predetermined command determination part 102C, a predetermined command outputting part 103D, a parameter determination part 102D, a parameter outputting part 103E, a setting part 109, a history determination part 102E, and a history outputting part 103F. These functions are mainly implemented by the CPU 11.
Modification 1-1

The first embodiment is regarding a case where the change information is output when however minor a change is made to the setting data. In this modification, the change information is output on condition that a predetermined change is made to the setting data. The following description of this modification is regarding a case where the setting data is a program that includes a command for operating the controller 21.

This modification implements the predetermined change determination part 102B, the predetermined command determination part 102C, the predetermined change outputting part 103C, and the predetermined command outputting part 103D. The predetermined change determination part 102B determines whether a predetermined change has been made to the setting data based on the setting data at each time point of a plurality of time points.

As used herein, the term "predetermined change" refers to a particular change that, when the particular change is made, causes the change information to be output. The predetermined change may be specified by the user or specified in advance. Also, the predetermined change may be common to all the controllers 21 or may be specified on an individual controller 21 basis. For example, a predetermined change is an addition, a change, or a deletion of a predetermined command in a program. This command is a command that can largely affect the motion of the robot 22. Examples of the command include, but are not limited to, a command for changing linear interpolation to link interpolation, a command for changing link interpolation to linear interpolation, and a command for changing a waiting condition such as waiting time.

Modification 1-1 is regarding a case where the setting data is a program. In light of this, the predetermined change determination part 102B includes the predetermined command determination part 102C. For example, the predetermined command determination part 102C determines whether a change has been made to the predetermined command in the setting data based on the setting data at each time point of a plurality of time points. The predetermined command determination part 102C refers to a content of the change made to the setting data and determines whether the predetermined command is included in the content of the change. In one example, the predetermined command determination part 102C determines whether linear interpolation has been changed to link interpolation. In another example, the predetermined command determination part 102C determines whether link interpolation has been changed to linear interpolation. In another example, the predetermined command determination part 102C determines whether a waiting condition such as waiting time has been changed.

When the predetermined command determination part 102C determines that the predetermined change is made to the setting data, the predetermined change outputting part 103C outputs the change information. In other words, when the predetermined command determination part 102C determines that the predetermined change has not been made to the setting data, the predetermined change outputting part 103C does not output the change information. Thus, the predetermined change outputting part 103C outputs the change information on condition that the predetermined command determination part 102C determines that the predetermined change is made to the setting data.

This modification is regarding a case where the setting data is a program. In light of this, the predetermined change outputting part 103C includes the predetermined command outputting part 103D. For example, when the predetermined command determination part 102C determines that the predetermined change is made to the setting data, the predetermined command outputting part 103D outputs the change information. In other words, when the predetermined command determination part 102C determines that the predetermined change has not been made to the setting data, the predetermined command outputting part 103D does not output the change information. Thus, the predetermined change outputting part 103C outputs the change information on condition that the predetermined command determination part 102C determines that the predetermined change is made to the setting data.

In modification 1-1, the management server 10 determines whether a predetermined change has been made to the setting data, and outputs the change information when the management server 10 determines that the predetermined change is made to the setting data. This makes the user more likely to be aware of the predetermined change that is made, enabling the user to more readily manage the predetermined change made to the setting data. In one example, if the change information is output however minor the change made to the setting data is, the user may be too busy dealing with a flood of the change information to notice truly necessary change information. In light of this, the management server 10 outputs the change information only when a predetermined change is made. This prevents the user from being too busy dealing with a flood of the change information to notice truly necessary change information. This enables the user to more readily manage the predetermined change made to the setting data. In another example, when the predetermined change is a special change to which the user pays attention, the change information is output when the special change is made. This enables the user to more readily manage the change made to setting data.

Also, the management server 10 determines whether a change has been made to a predetermined command in the setting data, and outputs the change information when the management server 10 determines that the change is made to the predetermined command in the setting data. This makes the user more likely to be aware of the change made to the predetermined command, enabling the user to readily manage the change made to the setting data. In one example, if the change information is output however minor the change made to the setting data is, the user may be too busy dealing with a flood of the change information to notice truly necessary change information. In light of this, the management server 10 outputs the change information only when a change is made to a predetermined command. This prevents the user from being too busy dealing with a flood of the change information to notice truly necessary change information. This enables the user to more readily manage the change made to the setting data. In another example, when the predetermined command is a special command to which the user pays attention, the change information is output when a change is made to the command. This enables the user to more readily manage the change made to setting data.

Modification 1-2

While modification 1-1 is regarding a case where the setting data is a program, modification 1-2 is regarding a case where the setting data is a parameter. In this case, the predetermined change may be a change made to a predetermined parameter. This parameter is a parameter that can largely affect the motion of the robot 22. Examples of the parameter include, but are not limited to, a parameter denoting a track of the robot 22 and a parameter denoting waiting time of the robot 22. When the robot 22 is a spot robot, examples of the parameter include, but are not limited to, a parameter denoting the value of current through an electric gun and a parameter denoting a setting value of the period of time for which current flows through the electric gun.

Modification 1-2 implements the parameter determination part 102D and the parameter outputting part 103E. The parameter determination part 102D determines whether a change outside a reference range has been made to a parameter based on the parameter at each time point of a plurality of time points parameter. As used herein, the term "reference range" refers to such a range that the motion of the robot 22 can largely differ if, for example, a parameter is within or outside the range. In one example, when a parameter is a numerical value, the parameter determination part 102D determines whether the parameter is within a particular numerical range. In another example, when a parameter is an on/off value, the parameter determination part 102D determines whether the parameter is a particular value.

When the parameter determination part 102D determines that a change outside the reference range is made to the parameter, the parameter outputting part 103E outputs the change information. In other words, the parameter determination part 102D determines that no change outside the reference range is made to the parameter, the parameter outputting part 103E does not output the change information. Thus, the parameter outputting part 103E outputs the change information on condition that the parameter determination part 102D determines that a change outside the reference range is made to the parameter.

In modification 1-2, the management server 10 determines whether a change outside the reference range has been made to the parameter, and outputs the change information when the management server 10 determines that a change outside the reference range is made to the parameter. This makes the user more likely to be aware that a change outside the reference range is made to the parameter, enabling the user to more readily manage the change made to the parameter. In one example, if the change information is output however minor the change made to the parameter is, the user may be too busy dealing with a flood of the change information to notice truly necessary change information. In light of this, the management server 10 outputs the change information only when a change outside the reference range is made to the parameter. This prevents the user from being too busy dealing with a flood of the change information to notice truly necessary change information. This enables the user to more readily manage the change made to the parameter. In another example, when a level of the change is specified as a special threshold to which the user pays attention, the change information is output when such change is made, making the parameter outside the reference range. This enables the user to more readily manage the change made to the parameter.

Modification 1-3

The predetermined change described in modification 1-1 and modification 1-2 may be determined based on the controller 21. In modification 1-3, the data storage 100 stores relationships between the controllers 21 and predetermined changes. Modification 1-3 is regarding a case where the controller database DB stores these relationships. The relationships, however, may be stored in some other database. The predetermined change may be specified in any desired manner by the user or the worker, or may be specified in advance.

Modification 1-3 implements the setting part 109. The setting part 109 sets a predetermined change based on the controller 21 corresponding to the predetermined change. Specifically, the setting part 109 refers to the controller database DB and identifies a predetermined change related to the controller 21 whose influence information is to be displayed (the controller 21 whose information is to be displayed on the change information screen G3). The predetermined change determination part 102B performs determination processing based on the predetermined change set by the setting part 109. Details of the predetermined change determination part 102B are as described in modification 1-1 and modification 1-2.

In modification 1-3, a predetermined change serving as a basis of the determination as to whether to output the change information is set based on the controller 21, and the management server 10 outputs the change information when the predetermined change corresponding to the controller 21 is made. This enables the user to more readily manage the predetermined change made to the setting data.

Modification 1-4

The first embodiment is regarding a case where the latest version of the setting data and the most previous version of the setting data (a version that is one version previous to the latest version) are displayed on the change information screen G3. Another possible example is that a version that is two or more versions previous to the latest version is displayed on the change information screen G3. Another possible example is that pieces of past setting data are displayed on the change information screen G3 on a time-series basis.

In modification 1-4, the data storage 100 stores a history of the setting data collected by the collection part 101. As used herein, the term "history" refers to pieces of setting data at a plurality of time points. As described in the first embodiment, a backup of the setting data is obtained at every backup time, and thus the controller database DB stores a history of the setting data.

Modification 1-4 implements the history determination part 102E and the history outputting part 103F. Based on the history, the history determination part 102E determines whether a change has been made to the setting data. The history determination part 102E may compare the latest version of the setting data with the most previous version of the setting data, or may compare the latest version of the setting data with a version of the setting data that is two or more versions previous to the latest version. In another example, the history determination part 102E may compare, instead of the latest version of the setting data, pieces of the setting data at a plurality of time points in the past. For example, the history determination part 102E may compare a version of the setting data that is three versions previous to the latest version with a version of the setting data that is four versions previous to the latest version. The determination as to whether a change has been made to the setting data method is as described in the first embodiment.

When the history determination part 102E determines that a change is made to the setting data, the history outputting part 103F outputs the change information based on the history. The meaning of the change information is as described in the first embodiment. The history outputting part 103F outputs the change information based on the pieces of the setting data used in the history determination part 102E's comparison. For example, the history outputting part 103F causes the change information screen G3 to display the change information such that the change information is regarding a change found as a result of the comparison between the version of the setting data that is three versions previous to the latest version and the version of the setting data that is four versions previous to the latest version. Thus, the history outputting part 103F causes the change information screen G3 to display the change information regarding a change found between versions of the setting data previous to the most previous version.

In modification 1-4, the management server 10 outputs, based on a history of the setting data, the change information obtained by: a comparison between the latest version of the setting data with the most previous version of the setting data; or a comparison between the latest version of the setting data with a version of the setting data older than the most previous version. This ensures that more useful change information is output.

3-2. Modifications of Second Embodiment

Figure 17:
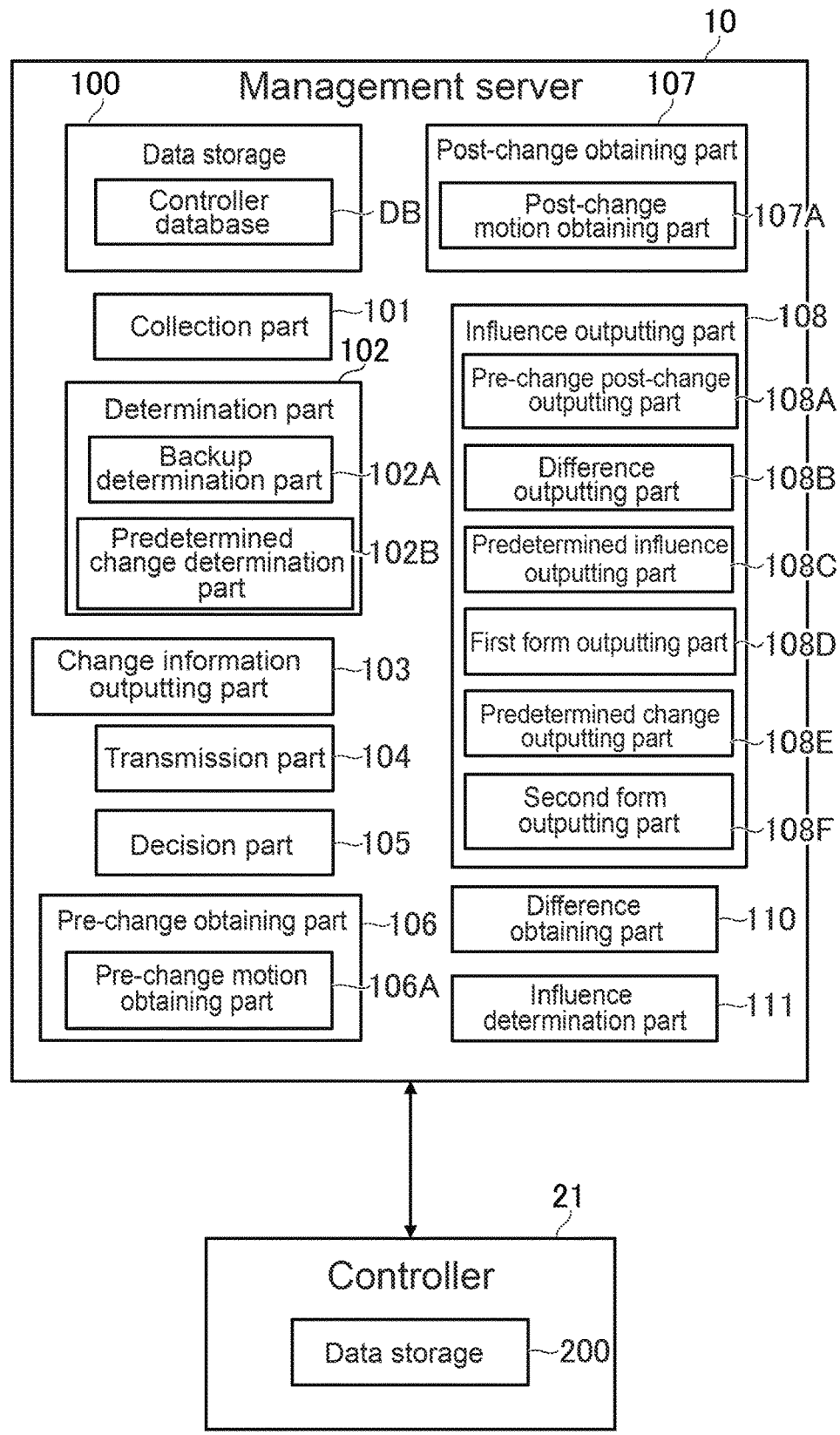
FIG. 17 is a functional block diagram of modifications of the second embodiment.

Modifications of the second embodiment will be described. FIG. 17 is a functional block diagram of modifications of the second embodiment. As illustrated in FIG. 17, the modifications of the second embodiment include a difference obtaining part 110, a difference outputting part 108B, an influence determination part 111, a predetermined influence outputting part 108C, a first form outputting part 108D, the predetermined change determination part 102B, a predetermined change outputting part 108E, and a second form outputting part 108F. These functions are mainly implemented by the CPU 11.

Modification 2-1

The second embodiment is regarding a case where pre-change information, which is information as of time before a change is made to the setting data, and post-change information, which is information as of time after a change is made to the setting data, are displayed on the change information screen G3. Another possible example is that a difference between the pre-change information and the post-change information are displayed on the change information screen G3, instead of displaying the pre-change information and the post-change information themselves.

Modification 2-1 implements the difference obtaining part 110 and the difference outputting part 108B. The difference obtaining part 110 obtains difference information. The difference information is regarding a difference between the pre-change information and the post-change information. As used herein, the term "difference" refers to a difference between the pre-change information and the post-change information. In one example, when the pre-change information and the post-change information are numerical values, the difference information is the difference between the numerical value of the pre-change information and the value numerical of the post-change information, which can be an increase amount or a decrease amount. In another example, when each of the pre-change information and the post-change information is a waveform of a torque signal, the difference information is the difference between the waveform of the pre-change information and the waveform of the post-change information.

FIG. 18 illustrates an example of the change information screen G3 according to modification 2-1. As illustrated in FIG. 18, the difference outputting part 108B, outputs, as difference information, information regarding of an influence(s) of a change made to the setting data, causing the change information screen G3 to display the amount of lifetime change and the amount of load factor change as of time after the change is made to the setting data.

In modification 2-1, the management server 10 obtains difference information, which is regarding the difference between the pre-change information (which is regarding a state of the controller 21 as of time before the change made to the setting data) and the post-change information (which is regarding a state of the controller 21 as of time after the change made to the setting data). Then, the management server 10 outputs the difference information as an influence of the change made to the setting data. This makes the user more likely to be aware of how much influential the change made to the setting data is.

Modification 2-2

The second embodiment is regarding a case where the influence information is displayed regardless of how much influential a change made to the setting data. In modification 2-2, the influence information is displayed only when a predetermined influence occurs.

Modification 2-2 implements the influence determination part 111 and the predetermined influence outputting part 108C. Based on the pre-change information and the post-change information, the influence determination part 111 determines whether an influence of a change made to the setting data is a predetermined influence. As used herein, the term "predetermined influence" refers to a particular influence that, when the particular influence occurs, causes the influence information to be output. The predetermined influence may be specified by the user or specified in advance. The predetermined influence may be common to all the controllers 21 or may be specified on an individual controller 21 basis. In one example, a predetermined influence is that the amount of lifetime change, the amount of load factor change, and/or the amount of change in the period of time spent in work becomes equal to or higher than a threshold. In another example, a predetermined influence a motion status becomes outside a reference range.

When the influence determination part 111 determines that the influence of the change made to the setting data is the predetermined influence, the predetermined influence outputting part 108C outputs the influence information, which is regarding the influence of the change made to the setting data. In other words, when the influence determination part 111 determines that the influence of the change made to the setting data is not the predetermined influence, the predetermined influence outputting part 108C does not output the influence information. Thus, the predetermined influence outputting part 108C outputs the influence information on condition that the influence determination part 111 determines that an influence of a change made to the setting data is a predetermined influence.

In modification 2-2, when the management server 10 determines that an influence of a change made to the setting data is a predetermined influence, the management server 10 outputs information regarding of the influence of the change made to the setting data. This makes the user more likely to be aware that an influence of a change made to the setting data is a predetermined influence. In one example, if the influence information is output however minor the influence of a change made to the setting data is, the user may be too busy dealing with a flood of the influence information to notice truly necessary influence information. Modification 2-2 prevents the user from being too busy dealing with a flood of the influence information to notice truly necessary influence information. In another example, when the predetermined influence is a special influence to which the user pays attention, the user is more likely to be aware that the special influence occurs.

Modification 2-3

Modification 2-2 is regarding a case where the influence information is displayed on condition that an influence of a change made to the setting data is a predetermined influence. In modification 2-3, when an influence of a change made to the setting data is a predetermined influence, a notification is displayed in a form that makes recognizable the fact that the influence is the predetermined influence. As used herein, the term "form" refers to a form of visual notification such as color, brightness, font size, font type, boldness, and/or underlining of a letter or a numerical value.

Modification 2-3 implements the influence determination part 111 and the first form outputting part 108D. The influence determination part 111 is as described in modification 2-2. The first form outputting part 108D outputs the influence information (which is regarding of an influence of a change made to the setting data) in a form that is based on the determination made by the influence determination part 111. The first form outputting part 108D makes the form of the influence information vary depending on whether the influence of the change made to the setting data is a predetermined influence or not. For example, when the influence of the change made to the setting data is the predetermined influence, the first form outputting part 108D outputs the influence information in a first form (for example, in red), while when the influence of the change made to the setting data is not the predetermined influence, the first form outputting part 108D outputs the influence information in a second form (for example, in black).

In modification 2-3, the management server 10 makes a determination as to whether an influence of a change made to the setting data is a predetermined influence, and outputs the influence information in a form that is based on the determination. This makes the user more likely to be aware that the influence of the change made to the setting data is the predetermined influence. In one example, if the influence information is output in the same form common to all influences of a change made to the setting data, a significant influence and an insignificant influence are displayed in the same form. This makes it difficult for the user to be aware that a change to the setting data is having a significant influence. Modification 2-3 makes the user more likely to be aware that a change to the setting data is having a significant influence. In another example, when the predetermined influence is a special influence to which the user pays attention, the user is more likely to be aware that the special influence occurs.

Modification 2-4

Modification 2-2 is regarding a case where the influence information is displayed on condition that an influence of a change made to the setting data is a predetermined influence. In modification 2-4, the influence information is displayed when a predetermined change is made to the setting data.

Modification 2-4 implements the predetermined change determination part 102B and the predetermined change outputting part 108E. Based on the pre-change setting data and the post-change setting data, the predetermined change determination part 102B determines whether a predetermined change has been made to the setting data. This processing is similar to the processing described in modification 1-1.

When the predetermined change determination part 102B determines that the predetermined change is made to the setting data, the predetermined change outputting part 108E outputs the influence information, which is regarding an influence(s) of the change made to the setting data. In other words, when the predetermined change determination part 102B determines that the predetermined change has not been made to the setting data, the predetermined change outputting part 108E does not output the influence information. Thus, the predetermined influence outputting part 108C outputs the influence information on condition that the predetermined change determination part 102B determines that the predetermined change is made to the setting data.

In modification 2-4, the management server 10 determines whether a predetermined change has been made to the setting data, and outputs information regarding of an influence of the predetermined change made to the setting data, when the management server 10 determines that the predetermined change is made to the setting data. This makes the user more likely to be aware of the predetermined change made to the setting data, enabling the user to readily manage the change made to the setting data. In one example, if the influence information is output however minor the change made to the setting data is, the user may be too busy dealing with a flood of the influence information to notice truly necessary influence information. Modification 2-4 prevents the user from being too busy dealing with a flood of the influence information to notice truly necessary influence information. This enables the user to readily manage the change made to setting data. In another example, when the predetermined change is a special change to which the user pays attention, the influence information is output when the special change is made. This enables the user to more readily manage the change made to setting data.

Modification 2-5

Modification 2-4 is regarding a case where the influence information is displayed on condition that a predetermined change is made to the setting data. In modification 2-5, when a predetermined change is made to the setting data, a notification is displayed in a form that makes recognizable the fact that the predetermined change is made to the setting data.

Modification 2-5 implements the predetermined change determination part 102B and the second form outputting part 108F. The predetermined change determination part 102B is as described in modification 2-4. The second form outputting part 108F outputs the influence information (which is regarding an influence(s) of the change made to the setting data) in a form that is based on the determination made by the predetermined change determination part 102B. The second form outputting part 108F makes the form of the influence information vary depending on whether the predetermined change is made to the setting data or not. For example, when the predetermined change is made to the setting data, the second form outputting part 108F outputs the influence information in the first form, while when the predetermined change has not been made to the setting data, the second form outputting part 108F outputs the influence information in the second form.

In modification 2-5, the management server 10 makes a determination as to whether a predetermined change has been made to the setting data, and outputs the influence information in a form that is based on the determination. This makes the user more likely to be aware of an influence of the predetermined change. In one example, if the influence information is output in the same form common to all influences of a change made to the setting data, a significant influence and an insignificant influence are displayed in the same form. This makes it difficult for the user to be aware that a change to the setting data is having a significant influence. Modification 2-5 makes the user more likely to be aware that a change to the setting data is having a significant influence. In another example, when the predetermined change is a special change to which the user pays attention, the user is more likely to be aware of the special change.

3-3. Other Modifications

The above-described described modifications may be combined with each other.

In another example, the management server 10 may not necessarily collect the setting data for backup purposes but may collect the setting data at any desired timing such as time when an alarm occurs. In another example, the industrial machine management system 1 may have either or both the functions described in the first embodiment or the functions described in the second embodiment. While in the above-described embodiments and modifications the main functions are implemented by the management server 10, the main functions may be assigned to a plurality of computers.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. An industrial machine management system, comprising:
   an industrial machine that controls a robot that includes motors and a management device, the management device having circuitry configured to:
   collect changeable setting data of the industrial machine as a backup, the setting data being a robot control program that causes the industrial machine to control the robot,
   determine whether a change has been made to the setting data by comparing the setting data collected as the backup at a first time point with the setting data collected as the back up at a second time point that is after the first time point,
   store the setting data collected as the backup and state information regarding a state of the industrial machine,
   obtain, as pre-change information, the stored state information regarding a pre-change state of each of the motors as of the first time prior to the change made to the setting data,
   obtain, as post-change information, the stored state information regarding a post-change state each of the motors as of the second time after the change made to the setting data, and
   display, in a display, the pre-change information and the post-change information, as influence information of each of the motors, the influence information regarding an influence of the change when the change has been made to the setting data,
   wherein the circuitry is configured to display the influence information, a program code of the robot control program at the first time, and a program code of the robot control program at the second time in a same screen.

2. The industrial machine management system according to claim 1, wherein when the change of at least one of the motors has been made, the circuitry is further configured to
   display the influence information of the at least one of the motors in an emphasized manner.

3. The industrial machine management system according to claim 1, wherein the change is an addition, a change, or a deletion of a predetermined command in the setting data, the predetermined command is a command that affects a moving path of the robot.

4. The industrial machine management system according to claim 1, wherein the circuitry is further configured to display, based on the pre-change information and the post-change information, influence information regarding an influence of the change on condition that when the change of a predetermined command has been made to the setting data.

5. The industrial machine management system according to claim 1, wherein the circuitry is further configured to display, based on the pre-change information and the post-change information, influence information regarding an influence of the change when the change has been made to the setting data, wherein the circuitry does not display the influence information when the change has not been made to the setting data.

6. The industrial machine management system according to claim 1, wherein the circuitry is further configured to store the state information based on a motion state of the robot detected by a sensor.

7. The industrial machine management system according to claim 1, wherein:
   the state information indicates at least one of lifetime of each of the motors and load factor of each of the motors,
   the pre-change information indicates the at least one of the lifetime of each of the motors and the load factor of each of the motors, and
   the post-change information indicates the at least one of the lifetime of each of the motors and the load factor of each of the motors.

8. The industrial machine management system according to claim 1, wherein the influence information of each of the motors is (1) position information regarding a position of each of the motors or (2) speed information regarding a speed of each of the motors.

9. The industrial machine management system according to claim 8, wherein the circuitry is further configured to transmit a change notification to a predetermined destination when the change is determined and decide the destination based on the industrial machine.

10. The industrial machine management system according to claim 1, wherein the circuitry is further configured to obtain the pre-change information based on a first status of a pre-change motion of the industrial machine, the pre-change motion being based on the setting data as of the first time prior to the change having been made to the setting data, and obtain the post-change information based on a second status of a post-change motion of the industrial machine, the post-change motion being based on the setting data as of the second time after the change has been made to the setting data.

11. The industrial machine management system according to claim 1, wherein the pre-change information denotes at least one of a lifetime, a load factor, a work duration, and a motion status associated with the industrial machine as of the first time prior to the change having been made to the setting data, the post-change information denotes at least one of the lifetime, the load factor, the work duration, and the motion status as of the second time after the change has been made to the setting data, and the influence information includes information regarding at least one of the lifetime, the load factor, the work duration, and the motion status.

12. A method for managing an industrial machine that controls a robot that includes motors, comprising:
    collecting changeable setting data of the industrial machine as a backup, the setting data being a robot control program that causes the industrial machine to control the robot;
    determining whether a change has been made to the setting data by comparing the setting data collected as the backup at a first time point with the setting data collected as the back up at a second time point that is after the first time point;
    storing the setting data collected as the backup and state information regarding a state of the industrial machine;
    obtaining, as pre-change information, the stored state information regarding a pre-change state of each of the motors as of the first time prior to the change made to the setting data;
    obtaining, as post-change information, the stored state information regarding a post-change state of each of the motors as of the second time after the change made to the setting data; and
    displaying, in a display, the pre-change information and the post-change information, as influence information of each of the motors, the influence information regarding an influence of the change when the change has been made to the setting data, wherein the method comprises displaying the influence information, a program code of the robot control program at the first time, and a program code of the robot control program at the second time in a same screen.

13. A non-transitory computer-readable storage medium storing a program for causing a computer to execute a method for managing an industrial machine that controls a robot that includes motors, the method comprising:
collecting changeable setting data of the industrial machine as a backup, the setting data being a robot control program that causes the industrial machine to control the robot;
determining whether a change has been made to the setting data by comparing the setting data collected as the backup at a first time point with the setting data collected as the back up at a second time point that is after the first time point;
storing the setting data collected as the backup and state information regarding a state of the industrial machine;
obtaining, as pre-change information, the stored state information regarding a pre-change state of each of the motors as of the first time prior to the change made to the setting data;
obtaining, as post-change information, the stored state information regarding a post-change state of each of the motors as of the second time after the change made to the setting data;
displaying, in a display, the pre-change information and the post-change information, as influence information of each of the motors, the influence information regarding an influence of the change when the change has been made to the setting data,
wherein the method comprises displaying the influence information, a program code of the robot control program at the first time, and a program code of the robot control program at the second time in a same screen.

14. The industrial machine management system according to claim 3, wherein the predetermined command is a command for changing linear interpolation to link interpolation or a command for changing link interpolation to linear interpolation.

15. The industrial machine management system according to claim 1, wherein the circuitry is further configured to determine, based on the pre-change information and the post-change information, whether the influence is a predetermined influence, and display the influence information when the influence has been determined as being the predetermined influence.

16. The industrial machine management system according to claim 2, wherein the circuitry is further configured to determine, based on the pre-change information and the post-change information, whether the influence is a predetermined influence, and display the influence information when the influence has been determined as being the predetermined influence.

17. The industrial machine management system according to claim 14, wherein the circuitry is further configured to determine, based on the pre-change information and the post-change information, whether the influence is a predetermined influence, and display the influence information when the influence has been determined as being the predetermined influence.

18. The industrial machine management system according to claim 1, wherein the influence information further indicates at least two of:
(1) lifetime of the motor,
(2) position information regarding a position of the motor,
(3) speed information regarding a speed of the motor,
(4) an amount of overshoot of the motor,
(5) a period of time spent in work,
(6) use amount of a CPU or a memory of the industrial machine,
(7) a load of communication of the industrial machine,
(8) a type of an alarm of the industrial machine, and
(9) a number of alarms occurring the industrial machine.

19. An industrial machine management system, comprising:
an industrial machine that controls a robot that includes motors and a management device, the management device having circuitry configured to:
collect changeable setting data of the industrial machine as a backup, the setting data being a robot control program that causes the industrial machine to control the robot,
determine whether a change has been made to the setting data by comparing the setting data collected as the backup at a first time point with the setting data collected as the back up at a second time point that is after the first time point,
store the setting data collected as the backup and state information regarding a state of the industrial machine,
obtain, as pre-change information, the stored state information regarding a pre-change state of each of the motors as of the first time prior to the change made to the setting data,
obtain, as post-change information, the stored state information regarding a post-change state of each of the motors as of the second time after the change made to the setting data, and
display, in a display, difference information regarding a difference between the pre-change information and the post-change information, as influence information of each of the motors, the influence information regarding an influence of the change when the change has been made to the setting data,
wherein the circuitry is configured to display the influence information, a program code of the robot control program at the first time, and a program code of the robot control program at the second time in a same screen.

* * * * *